(12) United States Patent
Usui et al.

(10) Patent No.: US 7,062,588 B2
(45) Date of Patent: Jun. 13, 2006

(54) DATA PROCESSING DEVICE ACCESSING A MEMORY IN RESPONSE TO A REQUEST MADE BY AN EXTERNAL BUS MASTER

(75) Inventors: Minoru Usui, Kawasaki (JP); Noriaki Ono, Kawasaki (JP); Yasushi Nagano, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 271 days.

(21) Appl. No.: 09/789,731

(22) Filed: Feb. 22, 2001

(65) Prior Publication Data

US 2001/0034805 A1   Oct. 25, 2001

(30) Foreign Application Priority Data

Mar. 31, 2000   (JP) ............................. 2000-099376

(51) Int. Cl.
   *G06F 13/36* (2006.01)
   *G06F 13/362* (2006.01)
   *G06F 13/00* (2006.01)

(52) U.S. Cl. ..................... 710/306; 710/113; 710/310; 710/315; 711/105

(58) Field of Classification Search ................. 710/63, 710/105, 112–113, 147, 111, 241, 305–306, 710/107, 74, 308–309, 311; 711/111–112, 711/105, 147
See application file for complete search history.

(56) References Cited

U.S. PATENT DOCUMENTS

| | | | | |
|---|---|---|---|---|
| 4,807,109 A | * | 2/1989 | Farrell et al. ................ | 713/401 |
| 5,317,709 A | * | 5/1994 | Sugimoto .................... | 711/105 |
| 5,379,384 A | * | 1/1995 | Solomon ...................... | 710/312 |
| 5,692,137 A | * | 11/1997 | Regal et al. ................. | 710/310 |
| 5,835,969 A | * | 11/1998 | Inagaki et al. .............. | 711/217 |
| 6,031,785 A | * | 2/2000 | Park et al. ............. | 365/230.08 |
| 6,101,565 A | * | 8/2000 | Nishtala et al. ............. | 710/307 |
| 6,292,861 B1 | * | 9/2001 | Fujiyama .................... | 710/112 |

FOREIGN PATENT DOCUMENTS

JP     11316736 A   * 11/1999

OTHER PUBLICATIONS

"CNET resources—info source—glossary—SDRAM". CNET, Inc. Online Jun. 5, 1997. Retrieved from Internet Dec. 7, 2004. <http://web.archive.org/web/19970605140734/http://www.cnet.com/Resources/Info/Glossary/Terms/sdram.html>.*

"Double Data Rate SDRAM (DDR SDRAM)". The PC Guide. Version 1.12.1. Online Jun. 26, 2000. Retrieved from Internet Apr. 28, 2005. <http://web.archive.org/web/20000817070554/http://www.pcguide.com/ref/ram/techDDRSDRAM-c.html>.*

* cited by examiner

*Primary Examiner*—Rehana Perveen
*Assistant Examiner*—Thomas J. Cleary
(74) *Attorney, Agent, or Firm*—Staas & Halsey LLP

(57) ABSTRACT

A data processing device exchanges data between a memory and an external bus master. The memory is connected to the data processing device via a first bus so as to store data. The external bus master is connected to the data processing device via a second bus so as to process data. The data processing device comprises a bus-transmission control unit accessing the memory via the first bus in response to a request to access the memory made by the external bus master via the second bus.

26 Claims, 15 Drawing Sheets

DATA PROCESSING DEVICE ACCESSING A MEMORY IN RESPONSE TO A REQUEST MADE BY AN EXTERNAL BUS MASTER

BACKGROUND OF THE INVENTION

1. Field of the Invention

The present invention generally relates to a data processing device and, more particularly, to a data processing device, a data processing method and a data processing system.

2. Description of the Related Art

FIG. 1 is an illustration of a structure of a conventional processing system comprising a Synchronized Dynamic Random Access Memory (SDRAM) capable of reading and writing data at high speed, and an SDRAM bus used to access the SDRAM.

As shown in FIG. 1, the conventional processing system comprises a first central processing unit (CPU) 1, a second central processing unit (CPU) 3, an SDRAM 5, a Read-Only Memory (ROM) 7, a Random Access Memory (RAM) 9, an input-output buffer (I/O) 11, an SDRAM bus 13 and a general purpose bus 15.

The SDRAM bus 13 and the general purpose bus 15 each connect the first CPU 1 and the second CPU 3. The ROM 7, the RAM 9 and the I/O 11, all of which are resources, are connected to the general purpose bus 15, and are accessible by both the first and second CPUs 1 and 3. The SDRAM 5 is connected to the SDRAM bus 13, and is accessible by both the first and second CPUs 1 and 3.

However, the conventional processing system involves the following problems.

Generally, a CPU exchanging data via the SDRAM bus 13 has complicated functions and many terminals, making the CPU costly. Also, as shown in FIG. 1, in order that a plurality of CPUs (the first and second CPUs 1 and 3, for example) use a memory area comprising one SDRAM 5 or a plurality of SDRAMs, the SDRAM bus 13 has to be connected to the SDRAM(s) and a plurality of the CPUs, complicating the transmission path of the SDRAM bus 13.

Further, although the SDRAM 5 is capable of operating at a high speed of an operating frequency equal to or more than 100 MHz, the above-mentioned complicated transmission path of the SDRAM bus 13 leads to decreasing the operating frequency.

Also, in order that a plurality of CPUs use a memory area in the SDRAM with using the SDRAM bus, arbitrating operations to decide which of the CPUs uses the SDRAM bus with priority need to be conducted between the CPUs. Therefore, means (comprising software and/or hardware) for controlling a plurality of the CPUs is complicated.

SUMMARY OF THE INVENTION

It is a general object of the present invention to provide an improved and useful data processing device in which device the above-mentioned problems are eliminated.

A more specific object of the present invention is to provide a data processing device and a data processing method which device and method can reduce a cost and a scale of a data processing system and, at the same time, can achieve a high-speed data processing; and the data processing system.

In order to achieve the above-mentioned objects, there is provided according to one aspect of the present invention a data processing device for exchanging data between a memory and an external bus master, the memory connected to the data processing device via a first bus so as to store data and the external bus master connected to the data processing device via a second bus so as to process data, the device comprising:

a bus-transmission control unit accessing the memory via the first bus in response to a request to access the memory made by the external bus master via the second bus.

The data processing device according to the present invention can avoid an access conflict that occurs when a plurality of external bus masters make accesses to a memory. Also, the external bus masters do not need to have a function to directly access the memory. This enables configuring a data processing system at a low cost.

Additionally, in the data processing device according to the present invention, the bus-transmission control unit supplies data read from the memory by accessing the memory to the external bus master via the second bus. Also, the bus-transmission control unit writes data supplied from the external bus master via the second bus to the memory by accessing the memory.

According to the present invention, a transmission path should only be connected between a memory, such as an SDRAM, and one data processing device, such as a CPU. This simplifies the transmission path, and thus enhances a speed of data being input/output to the memory and a speed of the data processing itself.

Additionally, the data processing device according to the present invention may further comprise a second-bus control unit granting a priority to use the second bus to the external bus master in response to a request to use the second bus made by the external bus master, the device capable of accessing the memory via the first bus even in a case where the second-bus control unit grants the priority to use the second bus to the external bus master except when the external bus master makes the request to access the memory.

According to the present invention, a data processing device, such as a CPU, can access a memory, such as an SDRAM, independently of operations of external bus masters. This achieves an efficient parallel data processing.

Additionally, the data processing device according to the present invention may further comprise an access-source judging unit judging which of the external bus master and the data processing device has priority when the external bus master makes the request to access the memory while the data processing device attempts to access one of the external bus master and the memory. This enhances an efficiency and a reliability of operations in data processing.

Additionally, in the data processing device according to the present invention, the bus-transmission control unit can differentiate a transmission speed of data transmitted through the first bus and a transmission speed of the data transmitted through the second bus. Also, the bus-transmission control unit can include a buffer storing data read from the memory so as to supply the data to the external bus master in accordance with a bus width of the second bus. This achieves a data processing in accordance with specifications of a memory and external bus masters, and thus enhances a degree of freedom in designing a data processing system.

In order to achieve the above-mentioned objects, there is also provided according to another aspect of the present invention a data processing system having a memory connected to a first bus so as to store data and a second data processing device connected to a second bus so as to process data, the system comprising:

a first data processing device connected to the first bus and the second bus so as to access the memory via the first bus in response to a request to access the memory made by the second data processing device via the second bus. The first data processing device supplies data read from the memory by accessing the memory to the second data processing device via the second bus. Also, the first data processing device writes data supplied from the second data processing device via the second bus to the memory by accessing the memory.

The data processing system according to the present invention can avoid an access conflict that occurs when the first data processing device and the second data processing device each make an access to a memory. Also, the second data processing device does not need to have a circuit to directly access the memory. This enhances a speed of access to the memory, and reduces a scale and a cost of a data processing system.

Other objects, features and advantages of the present invention will become more apparent from the following detailed description when read in conjunction with the accompanying drawings.

DETAILED DESCRIPTION OF THE PREFERRED EMBODIMENTS

Figure 1:
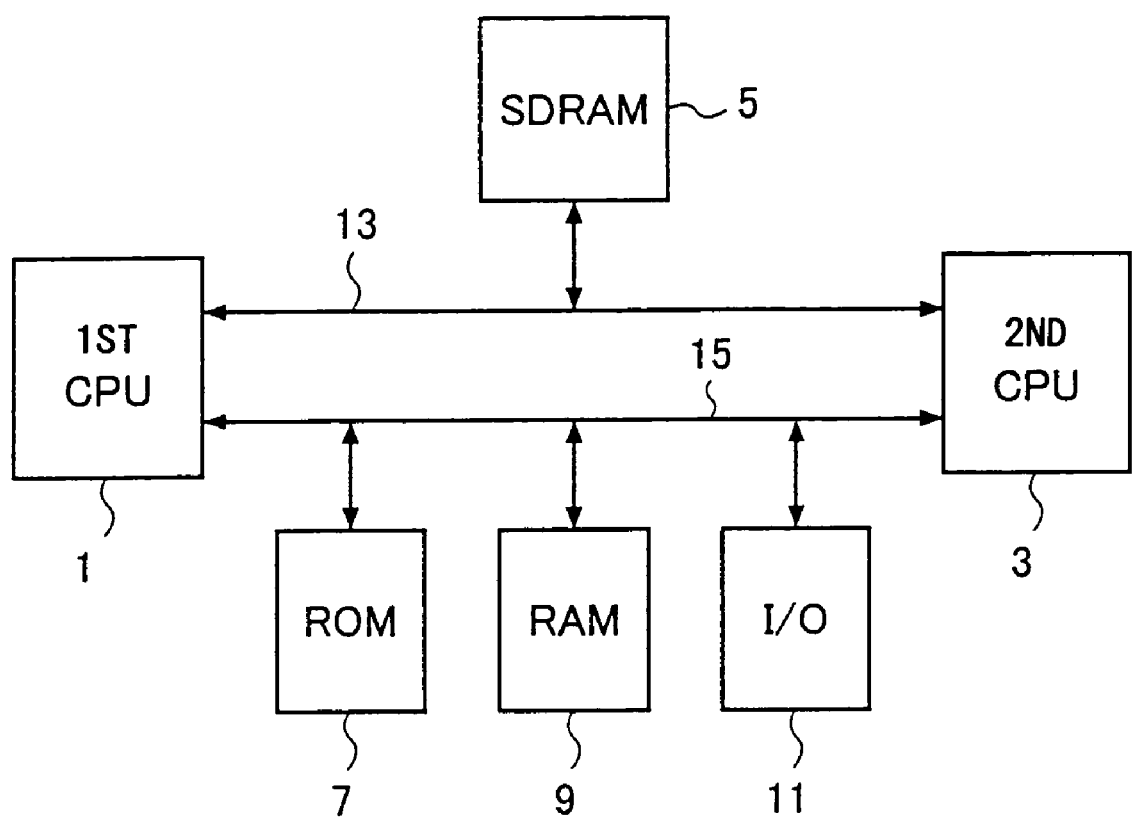
FIG. 1 is an illustration of a structure of a conventional processing system.

A description will now be given, with reference to the drawings, of embodiments according to the present invention. Elements in the drawings that are identical or equivalent are referenced by the same characters.

1. First Embodiment

Figure 2:
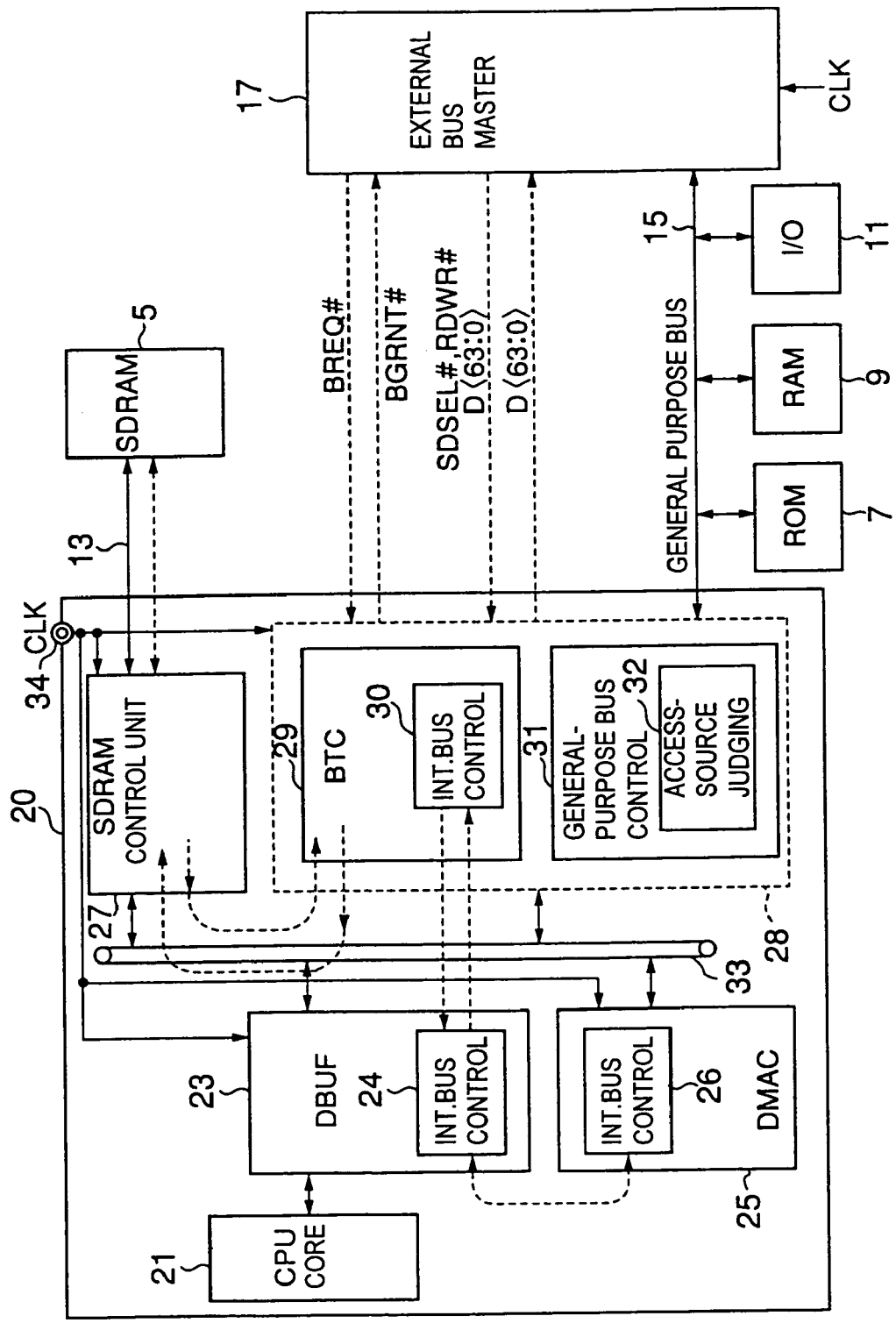
FIG. 2 is an illustration of a structure of a processing system according to a first embodiment of the present invention.

FIG. 2 is an illustration of a structure of a processing system according to a first embodiment of the present invention. As shown in FIG. 2, the processing system according to the first embodiment comprises the Synchronized Dynamic Random Access Memory (SDRAM) 5, the Read-Only Memory (ROM) 7, the Random Access Memory (RAM) 9, the input-output buffer (I/O) 11, the SDRAM bus 13, the general purpose bus 15, an external bus master 17 and a central processing unit (CPU) 20.

The CPU 20 comprises a CPU core 21, a data buffer (DBUF) 23, a DMA (Direct Memory Access) control unit (DMAC) 25, an SDRAM control unit 27, an external-bus control unit 28, an internal bus 33 and an external-clock-signal (CLK) input terminal 34. The external-bus control unit 28 includes a bus-transmission control unit (BTC) 29 and a general-purpose bus control unit 31. The general-purpose bus control unit 31 includes an access-source judging unit 32. The data buffer 23, the DMA control unit 25 and the bus-transmission control unit 29 include internal-bus control units 24, 26 and 30, respectively.

The SDRAM bus 13 connects the SDRAM 5 and the SDRAM control unit 27. The general purpose bus 15 connects the external bus master 17 and the external-bus control unit 28. The ROM 7, the RAM 9 and the I/O 11 are connected to the general purpose bus 15.

In the CPU 20, the data buffer 23, the DMA control unit 25, the SDRAM control unit 27 and the external-bus control unit 28 are connected to the internal bus 33. The CPU core 21 is connected to the data buffer 23. An external clock signal CLK is supplied to the CLK input terminal 34, and then is supplied to the SDRAM control unit 27 and the external-bus control unit 28.

Next, a description will be given of operations of the processing system having the above-mentioned structure. The most important feature of the processing system according to the present embodiment is that the CPU 20 has a bus-transmission function. Here, the "bus-transmission function" means a function that, in such a case where the external bus master 17 makes a request via the general purpose bus 15 to access the SDRAM 5, the CPU 20 accesses the SDRAM 5 via the SDRAM bus 13.

For example, in a case where the external bus master 17 makes a request to the CPU 20 via the general purpose bus 15 to access the SDRAM 5 so as to use data stored in the SDRAM 5, the CPU 20 accesses the SDRAM 5 by driving the SDRAM bus 13.

In a case where the external bus master 17 makes a request to write data to the SDRAM 5, the CPU 20 writes the data supplied from the external bus master 17 to an area in the SDRAM 5 specified by the external bus master 17. On the other hand, in a case where the external bus master 17 makes a request to read data from the SDRAM 5, the CPU 20 reads the data from an area in the SDRAM 5 specified by the external bus master 17, and then supplies the data to the external bus master 17 via the general purpose bus 15.

Therefore, since the CPU 20 has the bus-transmission function, the SDRAM bus 13 does not have to be connected to the external bus master 17, even when the external bus master 17 needs to access the SDRAM 5. Only the general purpose bus 15 has to be connected to the external bus master 17. This reduces a cost of the external bus master 17.

Also, as shown in FIG. 2, since the SDRAM 5 is connected to the CPU 20 alone, a transmission path of the SDRAM bus 13 is simplified. This also facilitates a high-speed operation of the SDRAM 5 in the processing system.

Further, since the CPU 20 alone accesses the SDRAM 5, the above-mentioned arbitrating operations do not require to be conducted between CPUs in using the SDRAM bus 13. Therefore, means (comprising software and/or hardware) for controlling the whole processing system is simplified. It is noted here that whether the CPU 20 accesses the SDRAM 5 for itself or in response to a request made by the external bus master 17 via the general purpose bus 15, for example, is controlled by means of hardware, as mentioned later.

Figure 3:
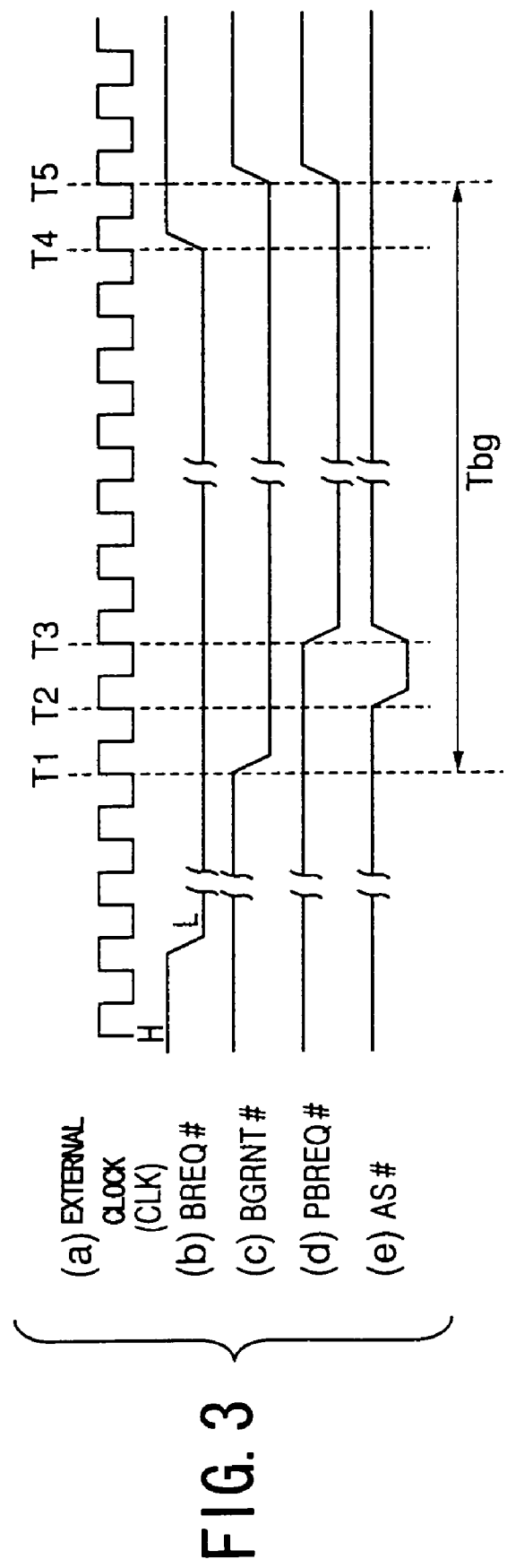
FIG. 3 is a first waveform diagram indicating operations of the processing system shown in FIG. 2.

Hereinafter, a description will be given in detail, with reference to FIG. 3, of operations of the processing system according to the first embodiment shown in FIG. 2. FIG. 3 is a first waveform diagram indicating operations of the processing system shown in FIG. 2. It is noted that a character "#" is attached to signals to be activated at a low level.

The CPU 20 operates as a so-called bus master using the general purpose bus 15 with initiative. Besides, in a case where a resource (the external bus master 17) capable of becoming a bus master in substitution for the CPU 20 is connected to the general purpose bus 15, the CPU 20 grants an access to the general purpose bus 15 in response to a request made by the external bus master 17 to release the general purpose bus 15. Here, the state where the CPU 20 releases the general purpose bus 15 is referred to as a "bus grant state".

More specifically, when the external bus master 17 makes a request to release the general purpose bus 15, a bus request signal BREQ# having a low level indicated by FIG. 3-(b) is supplied from the external bus master 17 via the general purpose bus 15 to the external-bus control unit 28. Then, when the external-bus control unit 28 judges that the general purpose bus 15 can be released, a bus grant signal BGRNT# being activated at a time T1 indicated by FIG. 3-(c) is supplied from the external-bus control unit 28 to the external bus master 17. The general purpose bus 15 is released in a period Tbg from the time T1 to a time T5 during which the bus grant signal BGRNT# is activated as shown in FIG. 3.

In the bus grant state where the CPU 20 releases the general purpose bus 15 in the above-mentioned manner, the external bus master 17 can access all of the resources connected to the general purpose bus 15. It is noted that, since the SDRAM 5 is connected not to the general purpose bus 15 but to the SDRAM bus 13 exclusively therefor, the external bus master 17 can not directly access the SDRAM 5 even in the bus grant state.

Then, when the CPU 20 needs to use the general purpose bus 15 after releasing the general purpose bus 15, the CPU 20 supplies a processor bus request signal PBREQ# activated at a low level indicated by FIG. 3-(d) to the external bus master 17 so as to request to stop using the general purpose bus 15. The above-mentioned processor bus request signal PBREQ# is activated to the low level at any time when the CPU 20 comes in need of using the general purpose bus 15 after the time T1 at which the bus grant signal BGRNT# is activated. It is note that FIG. 3-(d) indicates a case as an example where the processor bus request signal PBREQ# is activated at a time T3.

At a time T4 when the external bus master 17 finishes using the general purpose bus 15, the external bus master 17 supplies the external-bus control unit 28 with the bus request signal BREQ# being deactivated to a high level, as indicated by FIG. 3-(b). Then, after the external-bus control unit 28 confirms that the bus request signal BREQ# deactivated at the high level is supplied thereto, the external-bus control unit 28 deactivates the bus grant signal BGRNT# at the time T5 as indicated by FIG. 3-(c) so as to stop releasing and start using the general purpose bus 15.

In the above bus grant state, the CPU 20 supports a function that the external bus master 17 accesses the SDRAM 5 via the CPU 20. Hereinafter, such a function is also referred to as an "access-transmission function". Accordingly, a mode realizing the access-transmission function is referred to as an "access-transmission mode" or simply as a "transmission mode". The access itself made by the external bus master 17 via the CPU 20 to the SDRAM 5 is referred to simply as a "transmission access". The access-transmission function is realized, according to types of the access, as a single mode or a burst mode with a burst length of 4 or 8.

Figure 4:
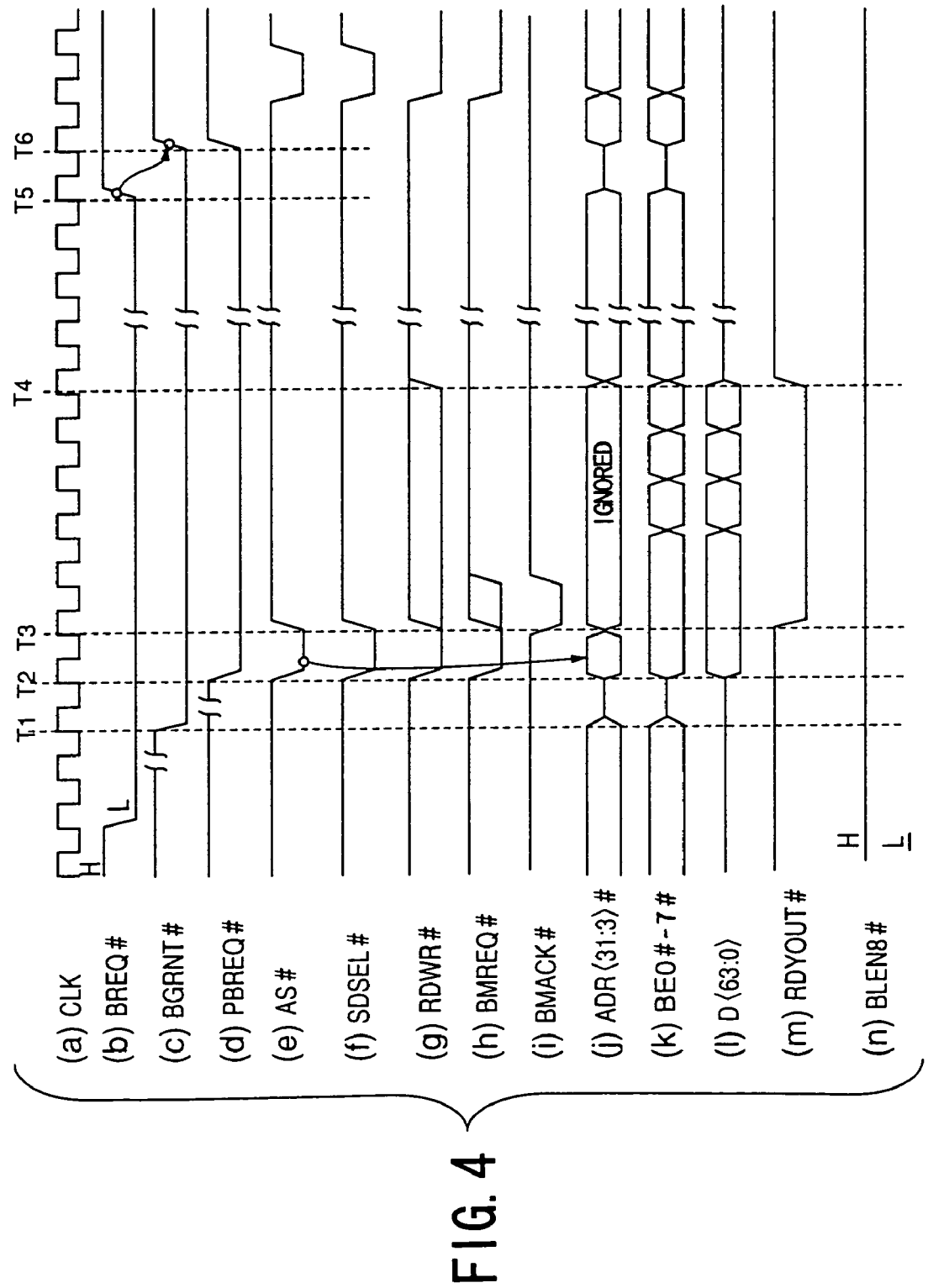
FIG. 4 is a second waveform diagram indicating operations of the processing system shown in FIG. 2.

Hereinafter, a description will be given, with reference to FIG. 4, of operations of the external bus master 17 writing data to the SDRAM 5 via the general purpose bus 15 and the CPU 20. FIG. 4 is a second waveform diagram indicating operations of the processing system shown in FIG. 2.

The external bus master 17 starts using the general purpose bus 15 when the bus grant signal BGRNT# (see FIG. 3) activated is supplied thereto. Then, when the external bus master 17 needs to access the SDRAM 5, the external bus master 17 activates an address strobe signal AS# and an SDRAM select signal SDSEL# to a low level at a time T2, for example, as indicated by FIG. 4-(e) and FIG. 4-(f), and supplies the address strobe signal AS# and the SDRAM select signal SDSEL# to the external-bus control unit 28. Thereby, the bus-transmission control unit (BTC) 29 detects an access by the external bus master 17 to the SDRAM 5. At this time, the BTC 29 retrieves an address specifying an access destination in the SDRAM 5 by an address signal ADR effective in a period from the time T2 to a time T3 during which the address strobe signal AS# is activated at the low level, as indicated by FIG. 4-(j).

Then, the BTC 29 reads or writes data from or to the SDRAM 5 according to a logical level of a read/write signal RDWR# supplied from the external bus master 17. That is, when the read/write signal RDWR# activated at a low level is supplied from the external bus master 17 in the period from the time T2 to the time T3 during which the address strobe signal AS# is activated at the low level, for example as indicated by FIG. 4-(g), the BTC 29 writes data to the SDRAM 5. On the other hand, when the read/write signal RDWR# at a high level is supplied from the external bus master 17, the BTC 29 reads data from the SDRAM 5.

In the above course, since the logical level of the read/write signal RDWR# is referenced by the BTC 29 in the period from the time T2 to the time T3 during which the address strobe signal AS# is activated, it does not matter whether the logical level of the read/write signal RDWR# is high or low in a certain period after the time T3, as indicated by FIG. 4-(g).

Also in the above course, in a case where the BTC 29 writes data to the SDRAM 5, the external bus master 17 starts transmitting data D to the SDRAM 5 at the same time (the time T2) when the address strobe signal AS# is activated to the low level, as indicated by FIG. 4-(e) and FIG. 4-(l).

In this course, the BTC 29 transmits the data D in a mode with a data length determined uniquely as shown in TABLE 1 below according to a combination of logical levels of a burst-mode transmission request signal BMREQ# and a burst-length specifying signal BLEN8# supplied thereto.

TABLE 1

| BMREQ# | BLEN8# | MODE OF TRANSMISSION |
|---|---|---|
| H | H | Single mode |
| L | H | 4-burst mode |
| L | L | 8-burst mode |
| H | L | Prohibited |

For example, when the burst-mode transmission request signal BMREQ# is at a low (L) level and the burst-length specifying signal BLEN8# is at a high (H) level in the period from the time T2 to the time T3 during which the address strobe signal AS# is activated as indicated by FIG. 4-(h) and FIG. 4-(n), the data D is transmitted in the 4-burst mode, as shown in TABLE 1 above, from the external bus master 17 to the SDRAM 5. It is noted that, when the external bus master 17 makes the request of the burst-mode transmission and the external-bus control unit 28 can acknowledge and permit the request, the external-bus control unit 28 supplies the external bus master 17 with a burst-mode transmission acknowledge signal BMACK# activated at a low level as indicated by FIG. 4-(i).

It is noted that, when the external bus master 17 makes the request of the burst-mode transmission, the CPU 20 never cancels the request, but always supplies the external bus master 17 with the burst-mode transmission acknowledge signal BMACK#. It is also noted that, since the logical level of the burst-mode transmission request signal BMREQ# is referenced by the BTC 29 in the period from the time T2 to the time T3 during which the address strobe signal AS# is activated, it does not matter whether the logical level of the burst-mode transmission request signal BMREQ# is high or low in a period after the time T3 until the burst-mode transmission acknowledge signal BMACK# is supplied to the external bus master 17, as indicated by FIG. 4-(h).

In writing data to the SDRAM 5, the external-bus control unit 28 retrieves byte-effective signals BE0#–7# as well as the data from the general purpose bus 15, as indicated by FIG. 4-(k), and then, writes to the SDRAM 5 bytes of the data corresponding to the byte-effective signals BE0#–7# having a low (L) level.

The external-bus control unit 28 supplies a bus cycle end signal RDYOUT# at a low level to the external bus master 17 from a point at which the external-bus control unit 28 starts retrieving the data D from the external bus master 17, as indicated by FIG. 4-(m), so as to notice that the data D is being effectively retrieved.

In the above-mentioned case where the data D is transmitted in the 4-burst mode from the external bus master 17 to the SDRAM 5, the last 2 bits of an address of the data D are made zero. Therefore, the CPU 20 writes the data D to the SDRAM 5 by increasing the last 2 bits of the address one by one. Likewise, in a case where the data D is transmitted in the 8-burst mode, the last 3 bits of an address of the data D are made zero. Therefore, the CPU 20 writes the data D to the SDRAM 5 by increasing the last 3 bits of the address one by one.

In another case where the burst-mode transmission request signal BMREQ# is at a high (H) level and the burst-length specifying signal BLEN8# is also at a high (H) level in the period from the time T2 to the time T3 during which the address strobe signal AS# is activated, the (single) data D is written in the single mode to the SDRAM 5.

Figure 5:
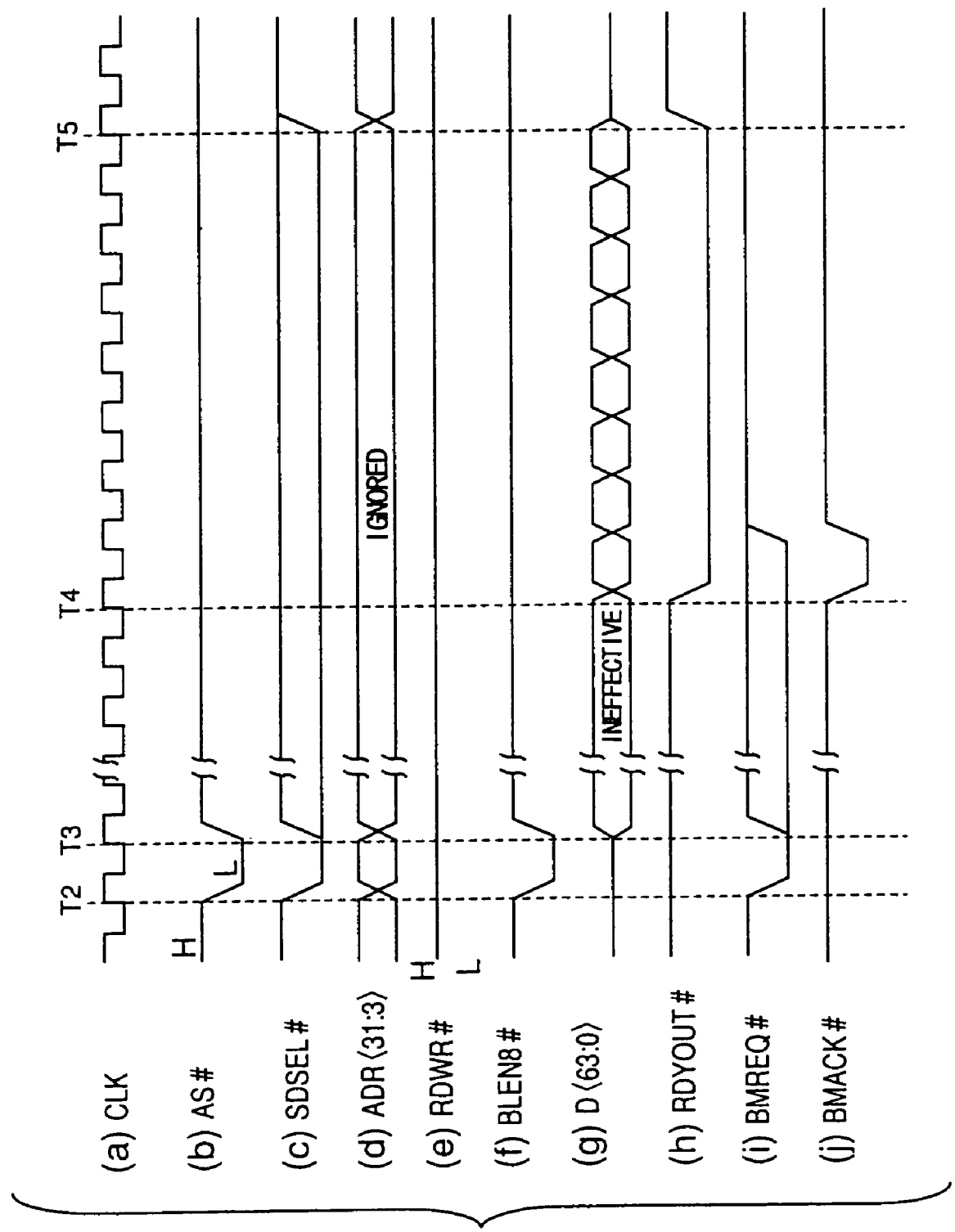
FIG. 5 is a third waveform diagram indicating operations of the processing system shown in FIG. 2.

Next, a description will be given, with reference to FIG. 5, of operations of the external bus master 17 reading data from the SDRAM 5 via the general purpose bus 15 and the CPU 20. FIG. 5 is a third waveform diagram indicating operations of the processing system shown in FIG. 2.

The external bus master 17 starts using the general purpose bus 15 when the bus grant signal BGRNT# (see FIG. 3) activated is supplied thereto. Then, when the external bus master 17 needs to access the SDRAM 5, the external bus master 17 activates the address strobe signal AS# and the SDRAM select signal SDSEL# to a low level at a time T2, for example, as indicated by FIG. 5-(b) and FIG. 5-(c), and supplies the address strobe signal AS# and the SDRAM select signal SDSEL# to the external-bus control unit 28. Thereby, the bus-transmission control unit (BTC) 29 detects an access by the external bus master 17 to the SDRAM 5. At this time, the BTC 29 retrieves an address specifying an access destination in the SDRAM 5 by the address signal ADR effective in a period from the time T2 to a time T3 during which the address strobe signal AS# is activated at the low level, as indicated by FIG. 5-(d).

Then, when the read/write signal RDWR# deactivated at a high level is supplied from the external bus master 17 in the period from the time T2 to the time T3 during which the address strobe signal AS# is activated at the low level, for example as indicated by FIG. 5-(e), the BTC 29 reads data from the SDRAM 5.

In this course, the BTC 29 transmits the data in a mode with a data length determined uniquely as shown in TABLE 1 above according to a combination of logical levels of the burst-mode transmission request signal BMREQ# and the burst-length specifying signal BLEN8# supplied thereto.

For example, when the burst-mode transmission request signal BMREQ# is at a low (L) level and the burst-length specifying signal BLEN8# is at a low (L) level in the period from the time T2 to the time T3 during which the address strobe signal AS# is activated as indicated by FIG. 5-(i) and FIG. 5-(f), the data D is transmitted in the 8-burst mode, as shown in TABLE 1 above, from the SDRAM 5 to the external bus master 17. It is noted that, when the external bus master 17 makes the request of the burst-mode transmission and the external-bus control unit 28 can acknowledge and permit the request, the external-bus control unit 28 supplies the external bus master 17 with the burst-mode transmission acknowledge signal BMACK# activated at a low level as indicated by FIG. 5-(j).

It is noted that, when the external bus master 17 makes the request of the burst-mode transmission, the CPU 20 never cancels the request, but always supplies the external bus master 17 with the burst-mode transmission acknowledge signal BMACK#. It is also noted that, since the logical level of the burst-mode transmission request signal BMREQ# is referenced by the BTC 29 in the period from the time T2 to the time T3 during which the address strobe signal AS# is activated, it does not matter whether the logical level of the burst-mode transmission request signal BMREQ# is high or low in a period after the time T3 until the burst-mode transmission acknowledge signal BMACK# is supplied to the external bus master 17, as indicated by FIG. 5-(i).

In reading data from the SDRAM 5, all bytes of the data are read from the SDRAM 5 irrespective of a logical level of the byte-effective signals BE0#–7#.

The external-bus control unit 28 supplies the bus cycle end signal RDYOUT# activated at a low level as well as the effective data D to the external bus master 17 at a time T4 when the external-bus control unit 28 is ready to send the data D read from the SDRAM 5 to the external bus master 17 via the general purpose bus 15, as indicated by FIG. 5-(h).

In a case where the data D is transmitted in the 4-burst mode from the SDRAM 5 to the external bus master 17, the last 2 bits of an address of the data D are made zero. Therefore, the CPU 20 reads the data D from the SDRAM 5 by increasing the last 2 bits of the address one by one. Likewise, in the above-mentioned case where the data D is transmitted in the 8-burst mode, the last 3 bits of an address of the data D are made zero. Therefore, the CPU 20 reads the data D from the SDRAM 5 by increasing the last 3 bits of the address one by one.

In another case where the burst-mode transmission request signal BMREQ# is at a high (H) level and the burst-length specifying signal BLEN8# is also at a high (H) level in the period from the time T2 to the time T3 during which the address strobe signal AS# is activated, the (single) data D is read in the single mode from the SDRAM 5.

Next, a description will be given of operations in the CPU 20, especially, operations involving an access right to use the internal bus 33. The following operations involving the access right to use the internal bus 33 are controlled by the internal-bus control units 24, 26 and 30 included in the data buffer 23, the DMA control unit 25 and the bus-transmission control unit 29, respectively. The access-source judging unit 32 included in the general-purpose bus control unit 31 is described later.

Any of the data buffer 23, the DMA control unit 25 and the bus-transmission control unit 29 can operate as a bus master to the internal bus 33 shown in FIG. 2. The SDRAM control unit 27 and the general-purpose bus control unit 31 operate as bus slaves to the internal bus 33. The internal bus 33 assumes three phases: an arbitration phase, an access request phase and a data transmission phase. A bus master to the internal bus 33 is determined in the arbitration phase. Then, the access request phase and the data transmission phase follow in series. The access request phase is, in any case, followed by the data transmission phase.

First, in the arbitration phase, the data buffer 23 decides on the access right to use the internal bus 33. The data buffer 23 has priority in using the internal bus 33. The decision on the access right to use the internal bus 33 is made by arbitration between the internal-bus control units 24 and 26 included in the data buffer 23 and the DMA control unit 25, respectively.

A burst-mode read and a single-mode write are basically employed in transmitting data in the internal bus 33. However, a burst-mode write is employed in rewriting data read by the DMA control unit 25 back to the SDRAM 5 via the SDRAM control unit 27, or in response to a request to write data to the SDRAM 5 made by the bus-transmission control unit (BTC) 29.

Figure 6:
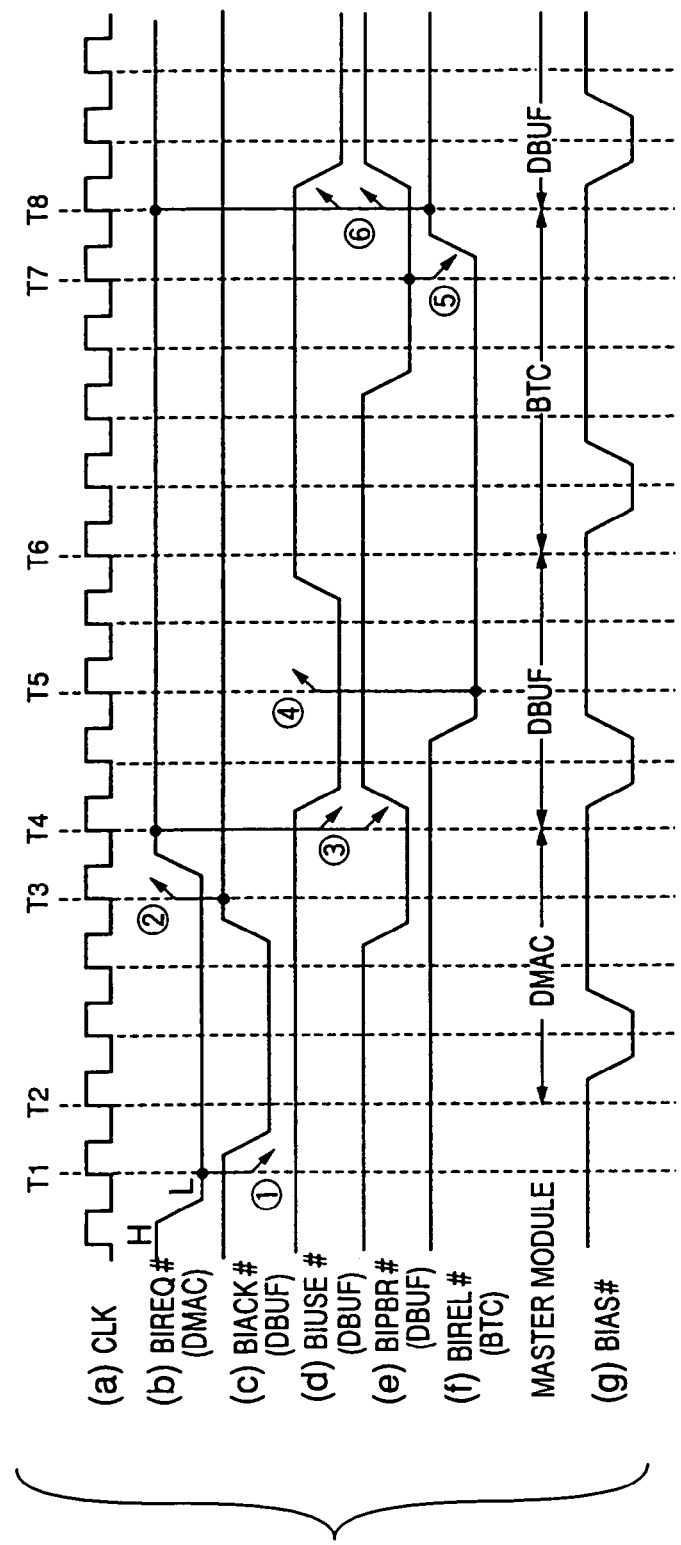
FIG. 6 is a first waveform diagram indicating operations of a central processing unit (CPU) shown in FIG. 2.

Next, a description will be given, with reference to FIG. 6, of the above-mentioned arbitration. FIG. 6 is a first waveform diagram indicating operations of the central processing unit (CPU) 20 shown in FIG. 2. As shown in FIG. 6, acting as a bus master to the internal bus 33 are: the DMA control unit 25 from a time T2 to a time T4; the data buffer 23 from the time T4 to a time T6; the bus-transmission control unit 29 from the time T6 to a time T8; the data buffer 23 after the time T8.

The arbitration over the bus access right between the DMA control unit 25 and the data buffer 23 is made by an internal-bus request signal BIREQ# indicated by FIG. 6-(b) and an internal-bus acknowledge signal BIACK# indicated by FIG. 6-(c). Also, the arbitration over the bus access right between the data buffer 23 and the bus-transmission control unit 29 is made by an internal-bus use signal BIUSE# indicated by FIG. 6-(d), an internal-bus processor bus request signal BIPBR# indicated by FIG. 6-(e) and an internal-bus release request signal BIREL# indicated by FIG. 6-(f). It is noted that an internal-bus address strobe signal BIAS# indicated by FIG. 6-(g) is a signal indicating that a bus master makes a request to access a bus slave.

The DMA control unit 25 makes a request to use the internal bus 33 to the data buffer 23 by activating the internal-bus request signal BIREQ# to a low level, as indicated by FIG. 6-(b). Then, the data buffer 23 gives permission to use the internal bus 33 to the DMA control unit 25 by activating the internal-bus acknowledge signal BIACK# to a low level at a time T1, as indicated by FIG. 6-(c) (① in FIG. 6). When the data buffer 23 comes in need of using the internal bus 33 while the DMA control unit 25 uses the internal bus 33, the data buffer 23 deactivates the internal-bus acknowledge signal BIACK# to a high level at a time T3, as indicated by FIG. 6-(c), and activates the internal-bus processor bus request signal BIPBR# to a low level, as indicated by FIG. 6-(e). Then, when the DMA control unit 25 stops using the internal bus 33, the DMA control unit 25 deactivates the internal-bus request signal BIREQ# to a high level (② in FIG. 6).

In a period from the time T4 to the time T6 when the data buffer 23 uses the internal bus 33, the data buffer 23 activates the internal-bus use signal BIUSE# as indicated by FIG. 6-(d), and deactivates the internal-bus processor bus request signal BIPBR# as indicated by FIG. 6-(e) (③ in FIG. 6).

When the bus-transmission control unit 29 receives a request via the general purpose bus 15 to transmit data, the bus-transmission control unit 29 activates the internal-bus release request signal BIREL# at a time T5 as indicated by FIG. 6-(f) to request the data buffer 23 to release the internal bus 33. Then, in response to the internal-bus release request signal BIREL# being activated, the data buffer 23 deactivates the internal-bus use signal BIUSE# when the data buffer 23 stops using the internal bus 33, as indicated by FIG. 6-(d) (④ in FIG. 6).

Then, when the data buffer 23 comes in need of using the internal bus 33, the data buffer 23 activates the internal-bus processor bus request signal BIPBR# as indicated by FIG. 6-(e), and the bus-transmission control unit 29 deactivates the internal-bus release request signal BIREL# at a time T7 when the bus-transmission control unit 29 stops using the internal bus 33, as indicated by FIG. 6-(f) (⑤ in FIG. 6). Then, the data buffer 23 activates the internal-bus use signal BIUSE# at the time T8 after the internal-bus release request signal BIREL# is deactivated, as indicated by FIG. 6-(d), and deactivates the internal-bus processor bus request signal BIPBR# as indicated by FIG. 6-(e) (⑥ in FIG. 6).

Figure 7:
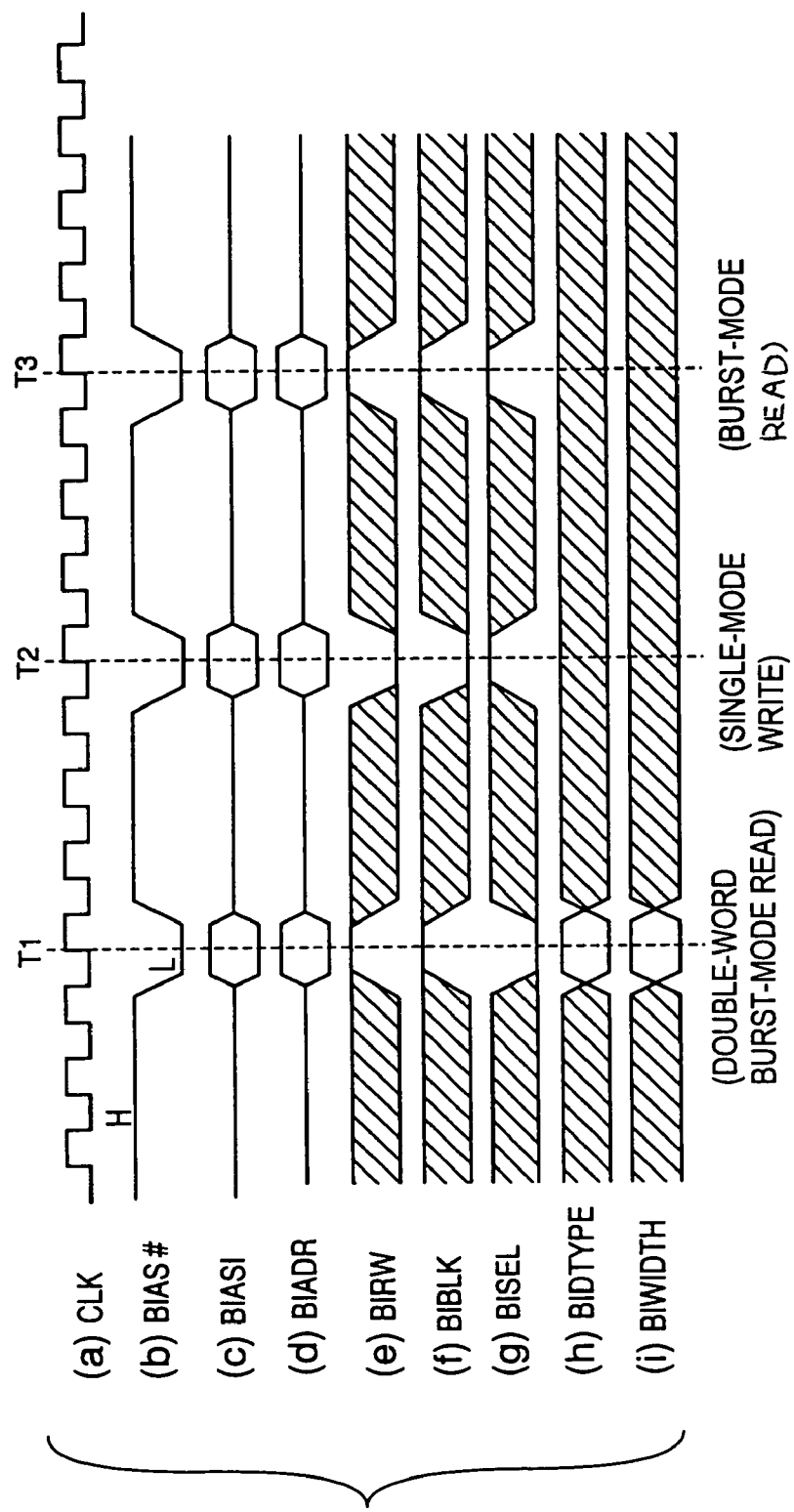
FIG. 7 is a second waveform diagram indicating operations of the central processing unit (CPU) shown in FIG. 2.

Next, a description will be given, with reference to FIG. 7, of the above-mentioned access request phase. FIG. 7 is a second waveform diagram indicating operations of the central processing unit (CPU) 20 shown in FIG. 2. As indicated by FIG. 7-(b), a bus master supplies a slave with the internal-bus address strobe signal BIAS# activated at a low level at a time T1 so as to make a request to access the slave. Herewith, as indicated by FIG. 7-(c), the bus master supplies the slave with an internal-bus address space identifying signal BIASI specifying an address space of the access' destination.

It is noted here that the bus master prohibits outputting the internal-bus address space identifying signal BIASI in the other phases than the access request phase and in the access request phase without the access right so as to avoid conflicts in using the internal bus 33.

Also, as indicated by FIG. 7-(d), the bus master supplies the slave with an internal-bus address signal BIADR at the time T1. The bus master also prohibits outputting the internal-bus address signal BIADR in the other phases than the access request phase and in the access request phase without the access right so as to avoid conflicts in using the internal bus 33.

Also, as indicated by FIG. 7-(e), the bus master supplies the slave with an internal-bus read/write signal BIRW at the time T1. The internal-bus read/write signal BIRW at a high level notifies the slave of a read access, while at a low level notifies the slave of a write access. Therefore, in an example indicated by FIG. 7-(e), the internal-bus read/write signal BIRW notices a read access at the time T1, a write access at a time T2 and a read access at a time T3.

Also, as indicated by FIG. 7-(f), the bus master supplies the slave with an internal-bus block transfer signal BIBLK at the time T1. The internal-bus block transfer signal BIBLK at a high level notifies the slave of a block transfer (a burst-mode transmission), while at a low level notifies the slave of a single transfer (a single-mode transmission). Therefore, in an example indicated by FIG. 7-(f), the internal-bus block transfer signal BIBLK notices a block transfer (a burst-mode transmission) at the time T1, a single transfer (a single-mode transmission) at the time T2 and a block transfer (a burst-mode transmission) at the time T3.

Also, as indicated by FIG. 7-(g), the bus master supplies the slave with an internal-bus slave selection signal BISEL at the time T1. The internal-bus slave selection signal BISEL at a high level notifies the slave of an access to an address area in the SDRAM 5, while at a low level notifies the slave of an access to an address area in a memory connected to the general purpose bus 15. Therefore, in an example indicated by FIG. 7-(g), the internal-bus slave selection signal BISEL notices an access to an address area in a memory connected to the general purpose bus 15 at the time T1 and an access to an address area in the SDRAM 5 at the time T2 and the time T3.

Also, at the time T1, as indicated by FIG. 7-(h), the slave supplies the general-purpose bus control unit 31 with an internal-bus data type signal BIDTYPE. The internal-bus data type signal BIDTYPE notices a size (effective bit width) of data sent from the slave to the general-purpose bus control unit 31. Further, at the time T1, as indicated by FIG. 7-(i), the slave supplies the general-purpose bus control unit 31 with a bus width signal BIWIDTH. The bus width signal BIWIDTH notices a bus width particular to each of the resources connected to the general purpose bus 15.

Figure 8:
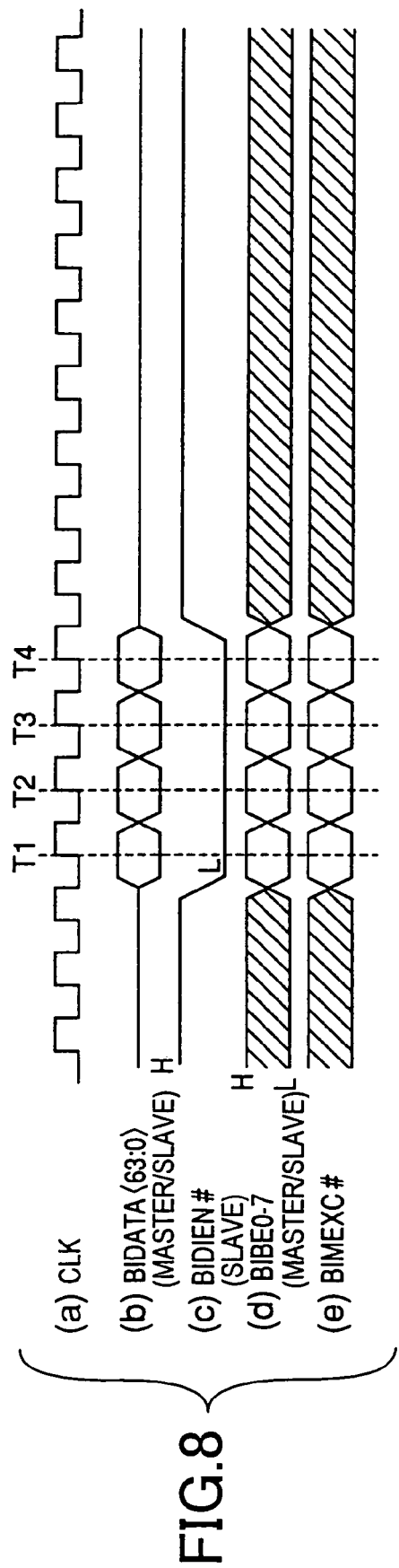
FIG. 8 is a third waveform diagram indicating operations of the central processing unit (CPU) shown in FIG. 2.
Figure 9:
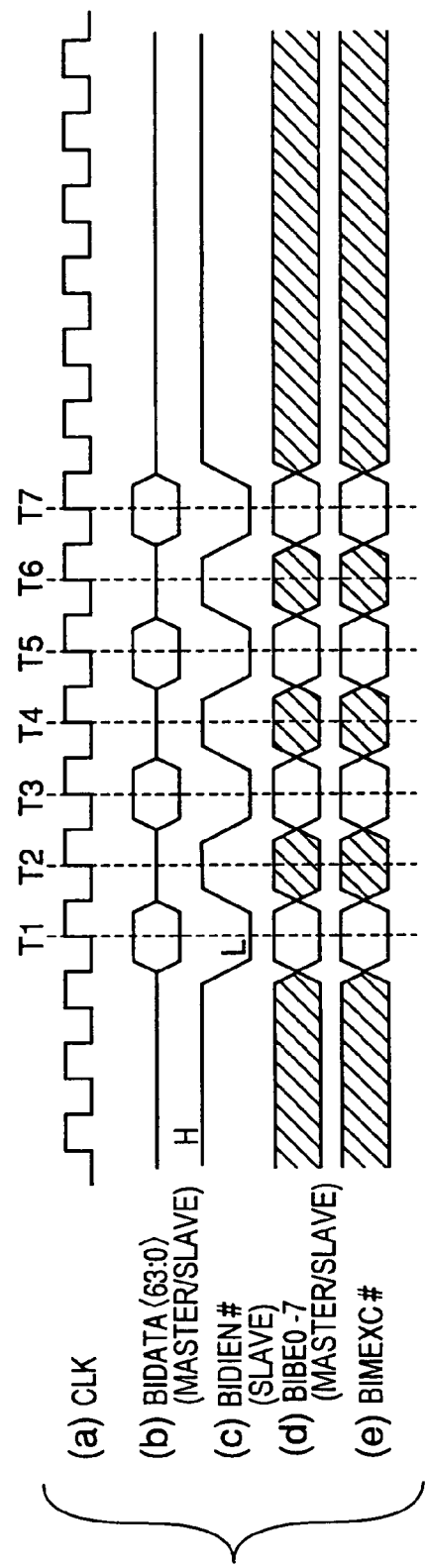
FIG. 9 is a fourth waveform diagram indicating operations of the central processing unit (CPU) shown in FIG. 2.
Figure 10:
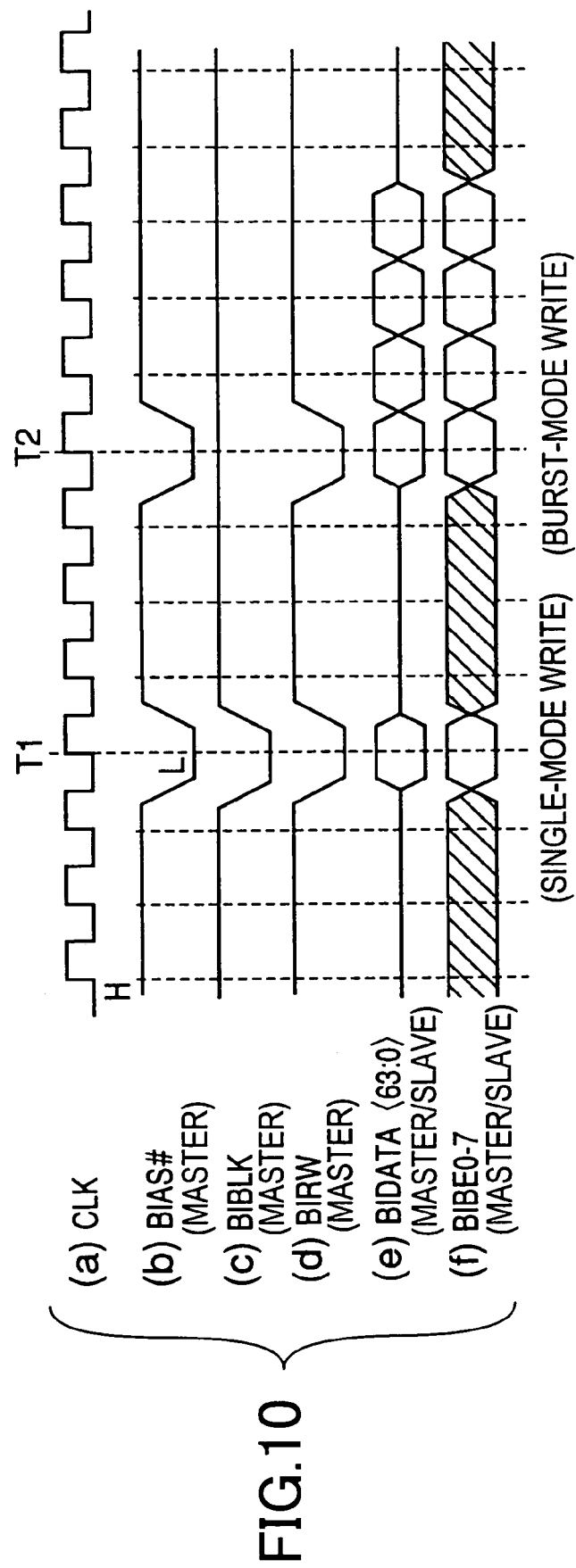
FIG. 10 is a fifth waveform diagram indicating operations of the central processing unit (CPU) shown in FIG. 2.

Next, a description will be given, with reference to FIG. 8 to FIG. 10, of the above-mentioned data transmission phase. FIG. 8 and FIG. 9 are third and fourth waveform diagrams indicating operations of the central processing unit (CPU) 20 shown in FIG. 2 reading data from the SDRAM 5. FIG. 10 is a fifth waveform diagram indicating operations of the central processing unit (CPU) 20 shown in FIG. 2 writing data to the SDRAM 5. FIG. 8 to FIG. 10 show cases with a burst length of 4.

The internal bus 33 deals with only 64-bit data. However, for external interfaces capable of treating less than 64-bit data, the SDRAM control unit 27 and the general-purpose bus control unit 31 convert the data in accordance with a bus width of each of the external interfaces.

FIG. 8 shows operations of the CPU 20 having the SDRAM bus 13 with a bus width of 64 bits. As indicated by FIG. 8-(a) and FIG. 8-(b), a data signal (BIDATA) is read from the SDRAM5 at from a time T1 to a time T4 in synchronization with so-called rising edges of the external clock signal CLK, for example. It is noted that the data signal (BIDATA) is a signal transmitting data, and that a bus master prohibits outputting the data signal (BIDATA) in the other phases than the data transmission phase and in the data transmission phase without the access right so as to avoid conflicts in using the internal bus 33.

At this time, as indicated by FIG. 8-(c), an internal-bus data enable signal BIDIEN# is activated at a low level. The internal-bus data enable signal BIDIEN# is a signal indicating the data signal (BIDATA) read above is to be transmitted to a destination resource at the next cycle. The SDRAM control unit 27 supplies the internal-bus data enable signal BIDIEN# to the destination resource at the same time of outputting the data signal (BIDATA) to the internal bus 33.

Also from the time T1 to the time T4, as indicated $\geqq$ by FIG. 8-(d), internal-bus byte-effective signals BIBE0–7 individually having a low level or a high level are supplied from the bus master to the SDRAM control unit 27. The internal-bus byte-effective signals BIBE0–7 indicate whether eight 8-bit areas (bytes) of 0–63 bits of the data signal (BIDATA) are permitted to be written, respectively. More specifically, bytes corresponding to the internal-bus byte-effective signals BIBE0–7 at a high level are permitted to be written, while bytes corresponding to the internal-bus byte-effective signals BIBE0–7 at a low level are forbidden to be written.

Also from the time T1 to the time T4, as indicated by FIG. 8-(e), internal-bus malfunction/exception signals BIMEXC# are individually activated at a low level or deactivated at a high level. The internal-bus malfunction/exception signals BIMEXC#, corresponding to double-word units, are activated, for example, when an address in the SDRAM 5 specified by the external bus master 17 in requesting to load or store data exceeds a range of addresses in the SDRAM 5, or when a malfunction is detected in a parity check of data which the external bus master 17 requests to load.

While FIG. 8 shows operations of the CPU 20 having the SDRAM bus 13 with the bus width of 64 bits, FIG. 9 shows operations of the CPU 20 having the SDRAM bus 13 with a bus width of 32 bits. When the SDRAM bus 13 has the bus width of 32 bits, the data signal (BIDATA) is transmitted at times T1, T3, T5 and T7, as indicated by FIG. 9-(b). Also, at the times T1, T3, T5 and T7, the internal-bus data enable signal BIDIEN# is activated, as indicated by FIG. 9-(c), and the internal-bus byte-effective signals BIBE0–7 and the internal-bus malfunction/exception signals BIMEXC# are individually activated or deactivated, as indicated by FIG. 9-(d) and FIG. 9-(e). That is, when the SDRAM bus 13 has the bus width of 32 bits, a data transmission rate is half the rate in the case where the SDRAM bus 13 has the bus width of 64 bits.

FIG. 10 shows operations of the CPU 20 writing data to the SDRAM 5, wherein the single-mode write is performed at a time T1, and the burst-mode write with a burst length of 4 is performed at a time T2. First, the internal-bus address strobe signal BIAS# is activated at a low level at the time T1, as indicated by FIG. 10-(b), so that a bus master makes a request to access to the SDRAM control unit 27 operating as a slave. Also, at the time T1, as indicated by FIG. 10-(c), the internal-bus block transfer signal BIBLK at a low level is supplied from the bus master to the SDRAM control unit 27 so as to specify a single-mode transmission.

Also, at the time T1, as indicated by FIG. 10-(d), the internal-bus read/write signal BIRW at a low level is supplied to the SDRAM 5 so as to notice a write access, and, as indicated by FIG. 10-(e), the (single) data signal (BIDATA) is supplied via the internal bus 33 to the SDRAM 5. Further, at the time T1, as indicated by FIG. 10-(f), the effective internal-bus byte-effective signals BIBE0–7 individually having a low level or a high level are supplied to the SDRAM 5 so as to write to the SDRAM 5 only bytes of the data signal (BIDATA) corresponding to the internal-bus byte-effective signals BIBE0–7 at the high level.

At the time T2, the CPU 20 operates in the same manner as at the time T1, except that, as indicated by FIG. 10-(c), the internal-bus block transfer signal BIBLK at a high level is supplied from the bus master to the SDRAM control unit 27 so as to specify a burst-mode transmission and supply the data signal (BIDATA) to the SDRAM 5 in the burst-mode, as indicated by FIG. 10-(e).

Figure 11:
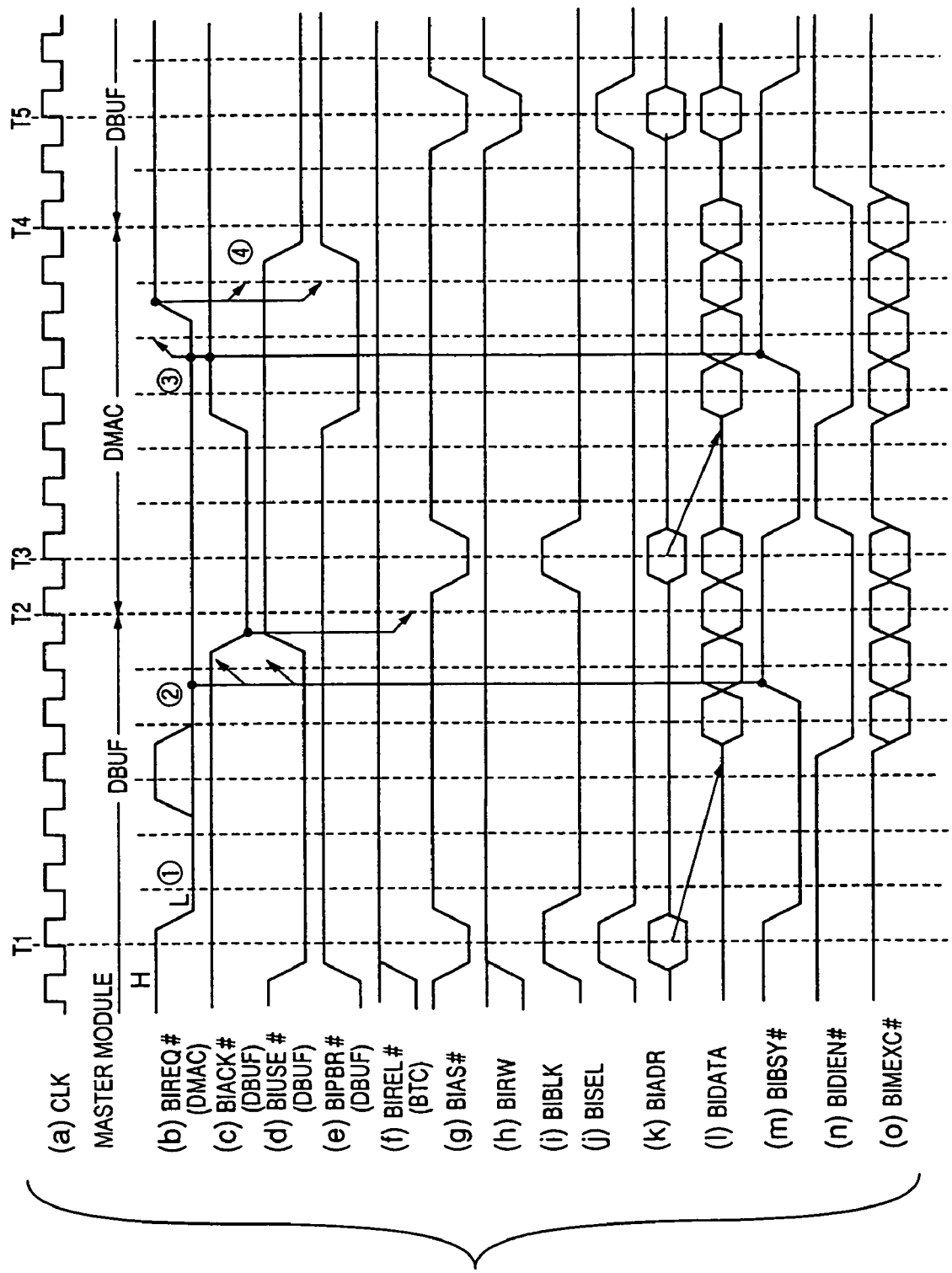
FIG. 11 is a first waveform diagram indicating a first example of operations of the central processing unit (CPU) shown in FIG. 2.

Hereinafter, descriptions will be given, with reference to FIG. 11 and FIG. 12, of two specific examples of operations of the CPU 20 involving the internal bus 33. FIG. 11 is a first waveform diagram indicating a first example of operations of the CPU 20 shown in FIG. 2. It is noted that an internal-bus busy signal BIBSY# is a signal indicating that an access request from a bus master cannot be accepted.

First, at a time T1, as indicated by FIG. 11-(g) and FIG. 11-(j), the internal-bus address strobe signal BIAS# activated and the internal-bus slave selection signal BISEL activated are supplied from the data buffer 23 to the SDRAM control unit 27 so as to make a request to access the SDRAM 5. At the same time, as indicated by FIG. 11-(h) and FIG. 11-(i), the internal-bus read/write signal BIRW and the internal-bus block transfer signal BIBLK both at a high level are supplied to the SDRAM control unit 27 so as to request a burst-mode read. Also, at the time T1, as indicated by FIG. 11-(k), the internal-bus address signal BIADR is supplied from the data buffer 23 to the SDRAM control unit 27. According to the internal-bus address signal BIADR supplied, the SDRAM control unit 27 reads the data signal (BIDATA) from the SDRAM 5 by increasing the address one by one, and transmits the data signal (BIDATA) in the 4-burst mode to the data buffer 23, as indicated by FIG. 11-(l).

Also, when this data transmission to the data buffer 23 is performed while the DMA control unit 25 supplies the activated internal-bus request signal BIREQ# to the data buffer 23, as indicated by FIG. 11-(b), so as to make a request to use the internal bus 33 (① in FIG. 11), the SDRAM control unit 27 supplies the deactivated internal-bus busy signal BIBSY# to the data buffer 23, as indicated by FIG. 11-(m). Then, in response to the deactivated internal-bus busy signal BIBSY#, the data buffer 23 supplies the activated internal-bus acknowledge signal BIACK# to the DMA control unit 25, as indicated by FIG. 11-(c), so as to permit the DMA control unit 25 to use the internal bus 33. At the same time, as indicated by FIG. 11-(d), the data buffer 23 deactivates the internal-bus use signal BIUSE# (② in FIG. 11).

In this way, at a time T2, the DMA control unit 25 replaces the data buffer 23 as a master module operating as a bus master to the internal bus 33.

Then, at a time T3, as indicated by FIG. 11-(g) and FIG. 11-(j), the DMA control unit 25 supplies the activated internal-bus address strobe signal BIAS# and the deactivated internal-bus slave selection signal BISEL to the general-purpose bus control unit 31 so as to make a request to access a memory connected to the general purpose bus 15. At the same time, as indicated by FIG. 11-(h) and FIG. 11-(i), the internal-bus read/write signal BIRW and the internal-bus block transfer signal BIBLK both at a high level are supplied to the general-purpose bus control unit 31 so as to request a burst-mode read.

Also, at the time T3, as indicated by FIG. 11-(k), the internal-bus address signal BIADR is supplied from the DMA control unit 25 to the general-purpose bus control unit 31. According to the internal-bus address signal BIADR supplied, the general-purpose bus control unit 31 reads the data signal (BIDATA) from the memory connected to the general purpose bus 15 by increasing the address one by one, and transmits the data signal (BIDATA) in the 4-burst mode to the DMA control unit 25, as indicated by FIG. 11-(l).

Also, when this data transmission to the DMA control unit 25 is performed while the data buffer 23 supplies the activated internal-bus processor bus request signal BIPBR#, as indicated by FIG. 11-(e), the general-purpose bus control unit 31 supplies the deactivated internal-bus busy signal BIBSY# to the DMA control unit 25 and the data buffer 23, as indicated by FIG. 11-(m). Then, in response to the deactivated internal-bus busy signal BIBSY#, the DMA control unit 25 supplies the deactivated internal-bus request signal BIREQ# to the data buffer 23, as indicated by FIG. 11-(b) (③ in FIG. 11).

Then, as indicated by FIG. 11-(d) and FIG. 11-(e), the data buffer 23 activates the internal-bus use signal BIUSE# and deactivates the internal-bus processor bus request signal BIPBR# (④ in FIG. 11). In this way, at a time T4, the data buffer 23 replaces the DMA control unit 25 as a master module.

Then, at a time T5, as indicated by FIG. 11-(g) and FIG. 11-(j), the internal-bus address strobe signal BIAS# activated and the internal-bus slave selection signal BISEL activated are supplied from the data buffer 23 to the SDRAM control unit 27 so as to make a request to access the SDRAM 5. At the same time, as indicated by FIG. 11-(h) and FIG. 11-(i), the internal-bus read/write signal BIRW and the internal-bus block transfer signal BIBLK both at a low level are supplied to the SDRAM control unit 27 so as to request a single-mode write. Also, at the time T5, as indicated by FIG. 11-(k) and FIG. 11-(l), the internal-bus address signal BIADR and the data signal (BIDATA) are supplied from the data buffer 23 to the SDRAM control unit 27. According to the internal-bus address signal BIADR supplied, at the time T5, the SDRAM control unit 27 writes the (single) data signal (BIDATA) to the SDRAM 5 in the single mode.

Next, a description will be given, with reference to FIG. 12, of a second specific example of operations of the CPU 20 involving the internal bus 33. FIG. 12 is a second waveform diagram indicating the second example of operations of the CPU 20 shown in FIG. 2.

Figure 12:
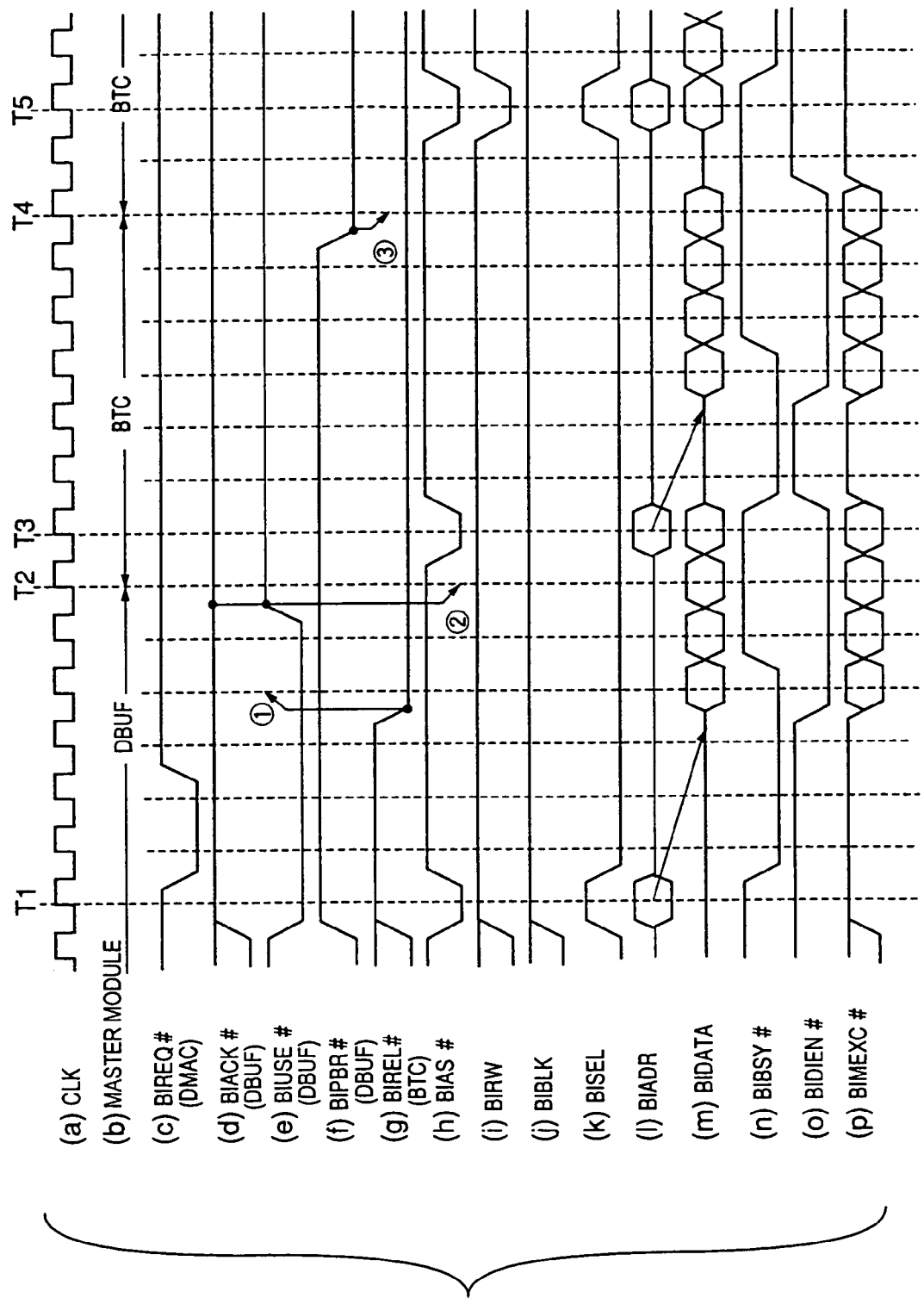
FIG. 12 is a second waveform diagram indicating a second example of operations of the central processing unit (CPU) shown in FIG. 2.

First, at a time T1, as indicated by FIG. 12-(h) and FIG. 12-(k), the internal-bus address strobe signal BIAS# activated and the internal-bus slave selection signal BISEL activated are supplied from the data buffer 23 to the SDRAM control unit 27 so as to make a request to access the SDRAM 5. At the same time, as indicated by FIG. 12-(i) and FIG. 12-(j), the internal-bus read/write signal BIRW and the internal-bus block transfer signal BIBLK both at a high level are supplied to the SDRAM control unit 27 so as to request a burst-mode read. Also, at the time T1, as indicated by FIG. 12-(l), the internal-bus address signal BIADR is supplied from the data buffer 23 to the SDRAM control unit 27. According to the internal-bus address signal BIADR supplied, the SDRAM control unit 27 reads the data signal (BIDATA) from the SDRAM 5 by increasing the address one by one, and transmits the data signal (BIDATA) in the 4-burst mode to the data buffer 23, as indicated by FIG. 12-(m).

Also, when this data transmission to the data buffer 23 is performed while the bus-transmission control unit 29 supplies the activated internal-bus release request signal BIREL# to the data buffer 23, as indicated by FIG. 12-(g), so as to make a request to release the internal bus 33, the SDRAM control unit 27 supplies the deactivated internal-bus busy signal BIBSY# to the data buffer 23, as indicated by FIG. 12-(*n*). Then, as indicated by FIG. 12-(*e*), the data buffer 23 deactivates the internal-bus use signal BIUSE# (①) in FIG. 12).

In this way, at a time T2, the bus-transmission control unit 29 replaces the data buffer 23 as a master module operating as a bus master to the internal bus 33, as indicated by FIG. 12-(*b*).

Then, at a time T3, as indicated by FIG. 12-(*h*) and FIG. 12-(*k*), the bus-transmission control unit 29 supplies the activated internal-bus address strobe signal BIAS# and the deactivated internal-bus slave selection signal BISEL to the general-purpose bus control unit 31 so as to make a request to access a memory connected to the general purpose bus 15 (② in FIG. 12). At the same time, as indicated by FIG. 12-(*i*) and FIG. 12-(*j*), the internal-bus read/write signal BIRW and the internal-bus block transfer signal BIBLK both at a high level are supplied to the general-purpose bus control unit 31 so as to request a burst-mode read.

Also, at the time T3, as indicated by FIG. 12-(*l*), the internal-bus address signal BIADR is supplied from the bus-transmission control unit 29 to the general-purpose bus control unit 31. According to the internal-bus address signal BIADR supplied, the general-purpose bus control unit 31 reads the data signal (BIDATA) from the memory connected to the general purpose bus 15 by increasing the address one by one, and transmits the data signal (BIDATA) in the 4-burst mode to the bus-transmission control unit 29, as indicated by FIG. 12-(*m*).

Then, at a time T4, when this data transmission to the bus-transmission control unit 29 is finished while the bus-transmission control unit 29 supplies the activated internal-bus release request signal BIREL#, as indicated by FIG. 12-(*g*) (③ in FIG. 12), the bus-transmission control unit 29 operates as follows.

At a time T5, as indicated by FIG. 12-(*h*) and FIG. 12-(*k*), the internal-bus address strobe signal BIAS# activated and the internal-bus slave selection signal BISEL activated are supplied from the bus-transmission control unit 29 to the SDRAM control unit 27 so as to make a request to access the SDRAM 5. At the same time, as indicated by FIG. 12-(*i*) and FIG. 12-(*j*), the internal-bus read/write signal BIRW at a low level and the internal-bus block transfer signal BIBLK at a high level are supplied to the SDRAM control unit 27 so as to request a burst-mode write. Also, at the time T5, as indicated by FIG. 12-(*l*) and FIG. 12-(*m*), the internal-bus address signal BIADR and the data signal (BIDATA) are supplied from the bus-transmission control unit 29 to the SDRAM control unit 27. According to the internal-bus address signal BIADR supplied, the SDRAM control unit 27 writes the data signal (BIDATA) to the SDRAM 5 in the burst mode.

Figure 13:
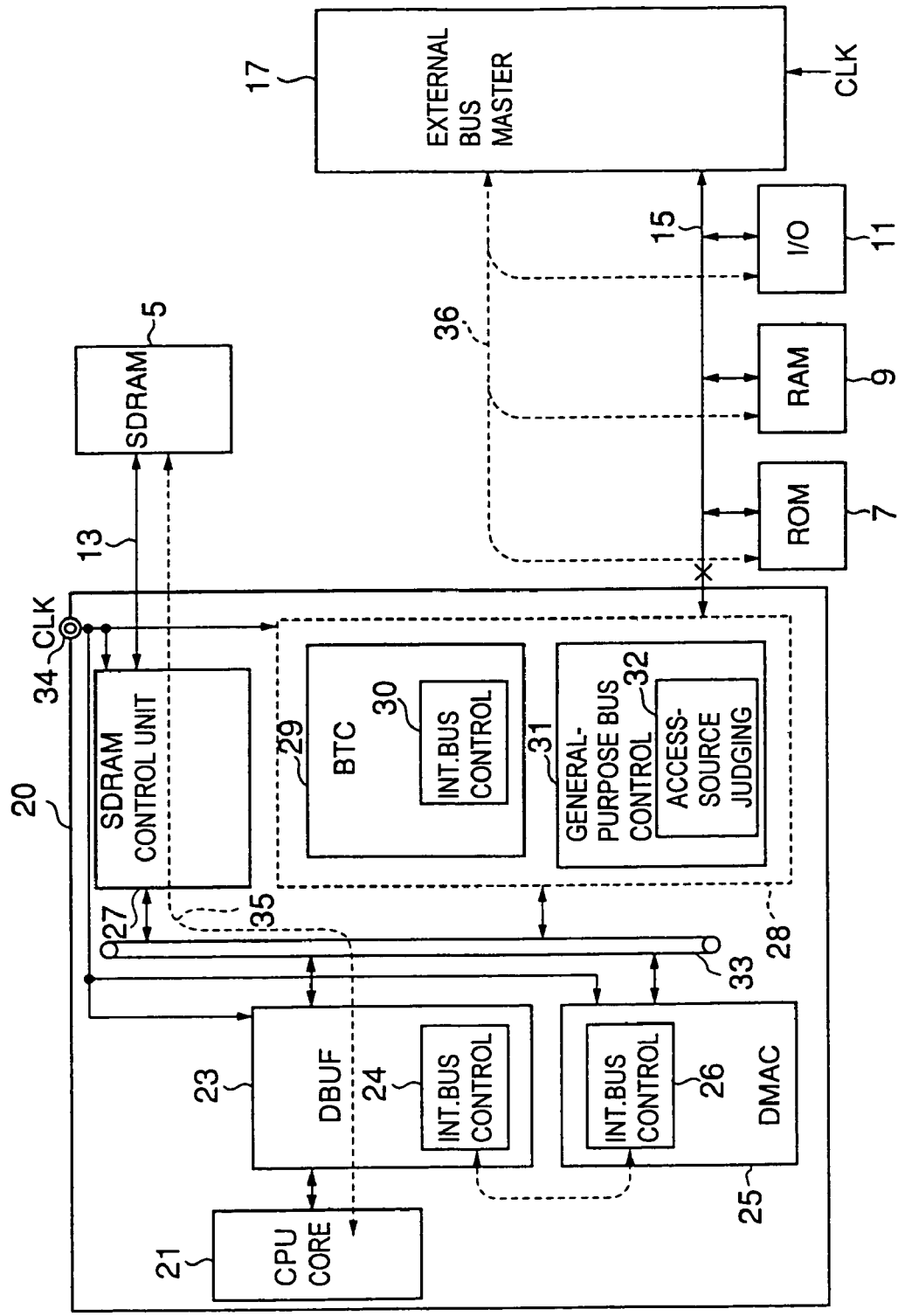
FIG. 13 is an illustration indicating operations of the processing system shown in FIG. 2.

In the above-mentioned processing system according to the first embodiment of the present invention, the general purpose bus 15 may be logically separated from the CPU 20 in the bus grant state where the external bus master 17 starts using the general purpose bus 15, as shown in FIG. 13. That is, in this case, the access-source judging unit 32 included in the general-purpose bus control unit 31 judges that which bus master makes a request to access the general-purpose bus control unit 31. Then, when the access-source judging unit 32 judges that such a bus master in the CPU 20 as the data buffer 23 makes a request to access via the general-purpose bus control unit 31 and then via the general purpose bus 15, the access-source judging unit 32 issues the internal-bus busy signal BIBSY# to the data buffer 23 so as to notice that the access request cannot be accepted.

Thereby, the data buffer 23 cancels an access to the general-purpose bus control unit 31, and accesses only the SDRAM control unit 27 by way of a path 35, while the external bus master 17 accesses by way of a path 36 the ROM 7, the RAM 9 or the I/O 11 connected to the general purpose bus 15.

Accordingly, by logically separating the general purpose bus 15 from the CPU 20 when the external bus master 17 starts using the general purpose bus 15 to access the ROM 7, the RAM 9 or the I/O 11 connected thereto, such a bus master in the CPU 20 as the data buffer 23 can access the SDRAM control unit 27 independently of operations of the external bus master 17 even while the external bus master 17 is using the general purpose bus 15.

As described above, the processing system according to the first embodiment of the present invention comprises the CPU 20, having the bus-transmission function (access-transmission function) and capable of processing data at high-speed, so that the processing system can achieve high-speed operations, and at the same time, can reduce a scale and a cost thereof.

2. Second Embodiment

Figure 14:
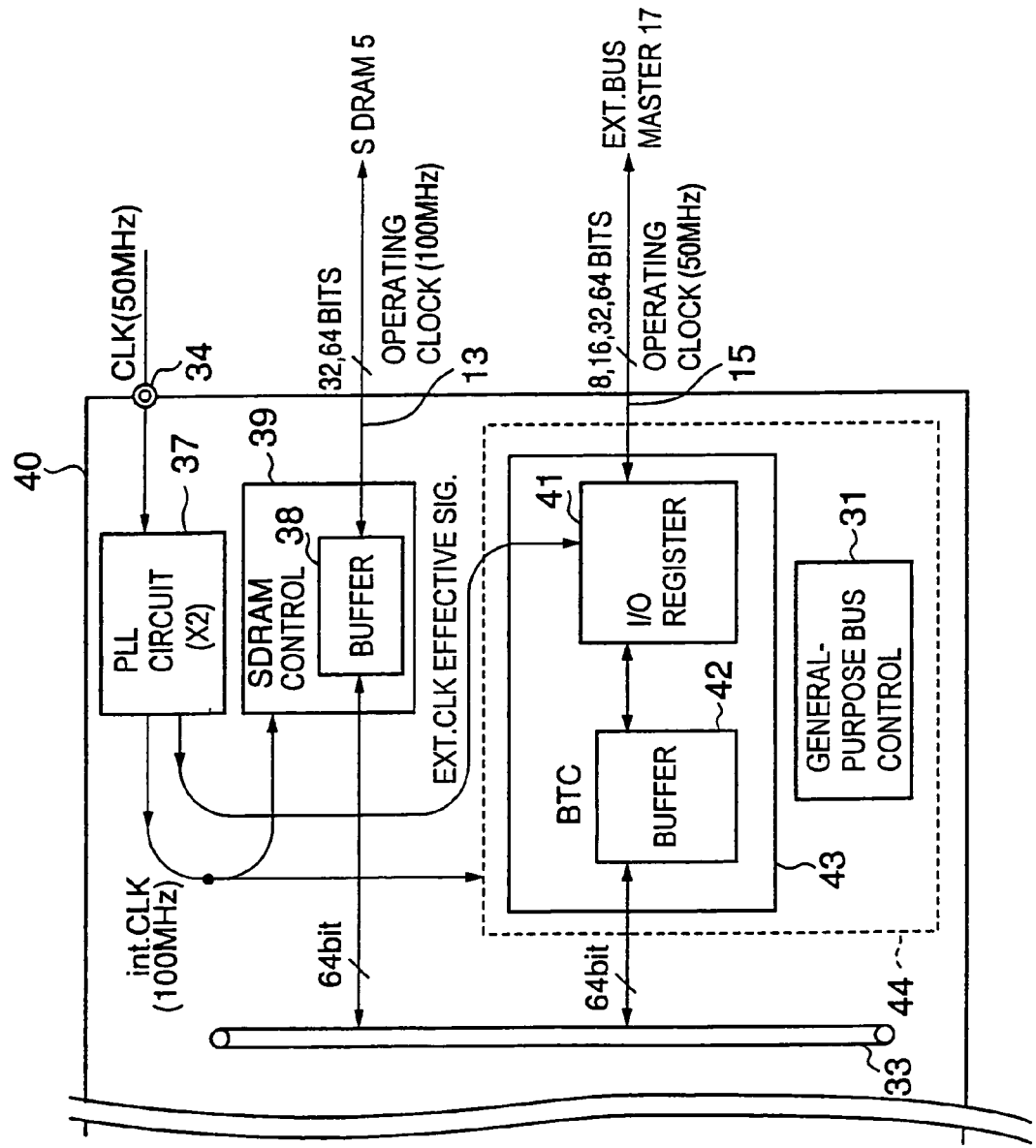
FIG. 14 is an illustration of a main structure of a central processing unit (CPU) according to a second embodiment of the present invention.

FIG. 14 is an illustration of a main structure of a central processing unit (CPU) according to a second embodiment of the present invention. As shown in FIG. 14, a central processing unit (CPU) 40 according to the second embodiment comprises the substantially same structure as the CPU 20 according to the first embodiment shown in FIG. 2, except mainly for further comprising a PLL circuit 37.

The PLL circuit 37 generates an internal clock signal int.CLK by doubling the external clock signal CLK supplied to the external-clock-signal (CLK) input terminal 34, and supplies the internal clock signal int.CLK to an SDRAM control unit 39 and an external-bus control unit 44. The PLL circuit 37 also generates and supplies an external-clock-effective signal (described later) to an I/O register 41 included in a bus-transmission control unit (BTC) 43. It is via a buffer 38 included in the SDRAM control unit 39 that data is transmitted from the SDRAM 5 and the internal bus 33.

Figure 15:
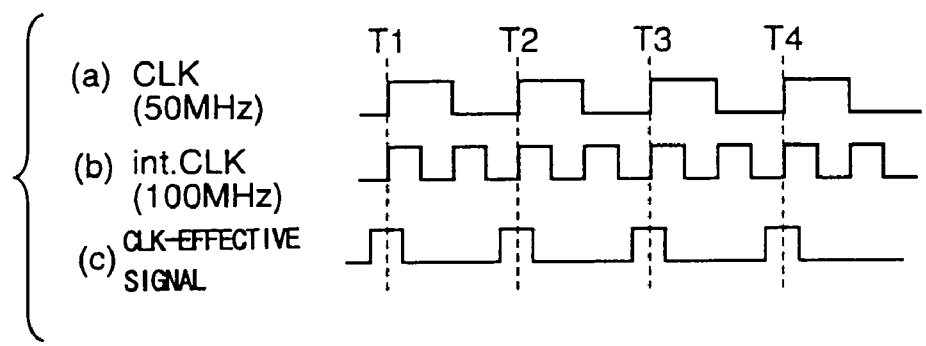
FIG. 15 is a waveform diagram indicating operations of the central processing unit (CPU) shown in FIG. 14.

Hereinafter, a description will be given, with reference to FIG. 15, of operations of the CPU 40 shown in FIG. 14, in a case where a frequency of the external clock signal CLK is 50 MHz. FIG. 15 is a waveform diagram indicating operations of the CPU 40 shown in FIG. 14. The external clock signal CLK having a frequency of 50 MHz indicated by FIG. 15-(*a*) is supplied to the external-clock-signal input terminal 34. The external clock signal CLK is doubled by the PLL circuit 37, so as to generate the internal clock signal int.CLK having a frequency of 100 MHz indicated by FIG. 15-(*b*). It is noted that an operating frequency of the CPU 40 is 100 MHz, based on the frequency of the internal clock signal int.CLK.

In this case, the SDRAM bus 13 operates at the same frequency of 100 MHz as the internal clock signal int.CLK. On the other hand, the general purpose bus 15 operates at the same frequency of 50 MHz as the external clock signal CLK.

As mentioned above, the PLL circuit 37 not only generates the internal clock signal int.CLK indicated by FIG. 15-(*b*) by multiplying the external clock signal CLK indicated by FIG. 15-(*a*) to a designated clock speed (two times in this case), but also generates the external-clock-effective signal indicated by FIG. 15-(*c*) representing so-called rise times of the external clock signal CLK at times T1 to T4 and so forth, and supplies the external-clock-effective signal to the I/O register 41.

In the CPU 40, data read from the SDRAM 5 and then supplied via the internal bus 33 to the external-bus control unit 44 is temporarily retained in a buffer 42 included in the bus-transmission control unit 43, and then is sent to the I/O register 41 operating with being triggered by the external-clock-effective signal. Accordingly, even in a case where the operating frequency of the CPU 40 differs from the frequency of the external clock signal CLK, the above-mentioned data is supplied via the general purpose bus 15 to the external bus master 17 as data in synchronization with the external clock signal CLK.

On the other hand, data to be written to the SDRAM 5 is transferred from the external bus master 17, and then is retained in the I/O register 41. Thereafter, the data is retained in the buffer 42 included in the bus-transmission control unit 43, and is consequently written to the SDRAM 5.

Additionally, while the general purpose bus 15 has a variable bus width of 8, 16, 32 or 64 bits in accordance with types of devices connected thereto, the internal bus 33 in the CPU 40 has a fixed bus width of 64 bits. Therefore, in a case where the internal bus 33 and the general purpose bus 15 have different bus widths, data is retained in the buffer 42 included in the bus-transmission control unit 43, and is divided and transmitted through the general purpose bus 15.

As described above, the CPU 40 according to the second embodiment achieves the same effects as the CPU 20 according to the first embodiment shown in FIG. 2 even in cases where the operating frequency of the CPU 40 differs from the frequency of the external clock signal CLK or where the internal bus 33 and the general purpose bus 15 have different bus widths.

It should be noted that, although the processing system using the SDRAM 5 capable of reading and writing data at high speed is mentioned in describing the above-mentioned first and second embodiments, the present invention identically applies to processing systems using a Double Data Rate (DDR) SDRAM, a Rambus DRAM or the like in place of the SDRAM 5.

The present invention is not limited to the specifically disclosed embodiments, and variations and modifications may be made without departing from the scope of the present invention.

The present application is based on Japanese priority application No. 2000-099376 filed on Mar. 31, 2000, the entire contents of which are hereby incorporated by reference.

What is claimed is:

1. A data processing unit connecting to a memory via a first bus and connecting to a bus master of an external data processing unit via a second bus, comprising:
 a second-bus control unit granting a priority to use said second bus to said external data processing unit; and
 a bus-transmission control unit accessing said memory via said first bus in response to a request to access said memory made by said bus master of the external data processing unit via said second bus, wherein the memory is an SDRAM, the first bus is an SDRAM dedicated bus and operates at a first clock frequency, and the second bus operates at a second clock frequency which is lower in speed than the first clock frequency,
 said bus-transmission control unit includes a register operating with being triggered by a signal indicating an effectiveness of the second clock frequency.

2. The data processing unit as claimed in claim 1, wherein said bus-transmission control unit supplies data read from said memory by accessing said memory to said bus master of the external data processing unit via said second bus.

3. The data processing unit as claimed in claim 1, wherein said bus-transmission control unit writes data supplied from said bus master of the external data processing unit via said second bus to said memory by accessing said memory.

4. The data processing unit as claimed in claim 1, wherein the second-bus control unit grants the priority to use said second bus to said bus master of the external data processing unit in response to a request to use said second bus made by said bus master of the external data processing unit, the data processing unit accessing said memory via said first bus even in a case in which said second-bus control unit grants the priority to use said second bus to said bus master of the external data processing unit except when said bus master of the external data processing unit makes the request to access said memory.

5. The data processing unit as claimed in claim 1, further comprising:
 an access-source judging unit judging which of said external data processing unit and the data processing unit has a priority when said bus master of the external data processing unit makes the request to access said memory while the data processing unit attempts to access one of said bus master of the external data processing unit and said memory.

6. The data processing unit as claimed in claim 1, wherein said bus-transmission control unit differentiates a transmission speed of data transmitted through said first bus and a transmission speed of the data transmitted through said second bus.

7. The data processing unit as claimed in claim 1, wherein said bus-transmission control unit includes a buffer storing data read from said memory so as to supply the data to said bus master of the external data processing unit in accordance with a bus width of said second bus.

8. The data processing unit as claimed in claim 1, wherein a data transfer between said external data processing unit and said memory is one of a burst mode transmission and a single mode transmission.

9. The data processing unit as claimed in claim 1, wherein the SDRAM is a DDR SDRAM.

10. A data processing method of connecting a data processing unit to a memory via a first bus and connecting the data processing unit to a bus master of an external data processing unit via a second bus, comprising:
 granting a priority to use said second bus to said external data processing unit; and
 accessing said memory via said first bus in response to a request to access said memory made by said bus master of the external data processing unit via said second bus, wherein the memory is an SDRAM, the first bus is an SDRAM dedicated bus and operates at a first clock frequency, and the second bus operates at a second clock frequency which is lower in speed than the first clock frequency,
 said bus-transmission control unit includes a register operating with being triggered by a signal indicating an effectiveness of the second clock frequency.

11. The data processing method as claimed in claim 10, further comprising:
 supplying data read from said memory by said accessing to said bus master of the external data processing unit via said second bus.

12. The data processing method as claimed in claim 10, further comprising:
writing data supplied from said bus master of the external data processing unit via said second bus to said memory accessed by said accessing.

13. The data processing method as claimed in claim 12, further comprising:
transferring of data between said external data processing unit and said memory by one of a burst mode transmission and a single mode transmission.

14. The data processing method as claimed in claim 12, wherein the SDRAM is a DDR SDRAM.

15. The data processing method as claimed in claim 10, wherein the granting of the priority to use said second bus to said bus master of the external data processing unit is in response to a request to use said second bus made by said bus master of the external data processing unit, further comprising:
accessing said memory via said first bus even in a case in which said granting grants the priority to use said second bus to said bus master of the external data processing unit except when said bus master of the external data processing unit makes the request to access said memory.

16. The data processing method as claimed in claim 10, further comprising:
differentiating a transmission speed of data transmitted through said first bus and a transmission speed of the data transmitted through said second bus.

17. The data processing method as claimed in claim 10, further comprising:
storing data read from said memory by said accessing in a buffer; and
supplying the data to said bus master of the external data processing unit in accordance with a bus width of said second bus.

18. A data processing system having a memory connected to a first bus, comprising:
a second data processing unit including an external bus master connected to a second bus granting a priority to use said second bus to said second data processing unit; and
a first data processing unit connected to said first bus and said second bus so as to access said memory via said first bus in response to a request to access said memory made by said second data processing unit via said second bus, wherein the memory is an SDRAM, the first bus is an SDRAM dedicated bus and operates at a first clock frequency, and the second bus operates at a second clock frequency which is lower in speed than the first clock frequency,
said bus-transmission control unit includes a register operating with being triggered by a signal indicating an effectiveness of the second clock frequency.

19. The data processing system as claimed in claim 18, wherein said first data processing unit supplies data read from said memory by accessing said memory to said second data processing unit via said second bus.

20. The data processing system as claimed in claim 18, wherein said first data processing unit writes data supplied from said second data processing unit via said second bus to said memory by accessing said memory.

21. The data processing system as claimed in claim 18, wherein a data transfer between said second data processing device and said memory is one of a burst mode transmission and a single mode transmission.

22. The data processing system as claimed in claim 18, wherein the SDRAM is a DDR SDRAM.

23. A data processing unit to connect with a memory via a first bus and to connect with a bus master of an external data processing unit via a second bus, comprising:
a bus control unit granting a priority use of said second bus to said external data processing unit; and
a bus-transmission control unit accessing said memory via said first bus in accordance with granting of the priority use to access said memory made by the bus control unit via said second bus, wherein the memory is an SDRAM, the first bus is an SDRAM dedicated bus and operates at a first clock frequency, and the second bus operates at a second clock frequency which is lower in speed than the first clock frequency,
said bus-transmission control unit includes a register operating with being triggered by a signal indicating an effectiveness of the second clock frequency.

24. A data processing unit to connect with a memory via a first bus, comprising:
a second bus to connect the data processing unit with an external device;
a bus control unit granting a priority use of a second bus; and
a bus-transmission control unit accessing said memory via said first bus in accordance with granting of a priority use to access said memory made by the bus control unit via said second bus, wherein the memory is an SDRAM, the first bus is an SDRAM dedicated bus and operates at a first clock frequency, and the second bus operates at a second clock frequency which is lower in speed than the first clock frequency,
said bus-transmission control unit includes a register operating with being triggered by a signal indicating an effectiveness of the second clock frequency.

25. A data processing method of connecting a data processing unit with a memory via a first bus, comprising:
connecting the data processing unit with an external device via a second bus;
granting a priority use of a second bus to the external device; and
accessing said memory via said first bus in accordance with the granting of the priority use to access said memory via said second bus, wherein the memory is an SDRAM, the first bus is an SDRAM dedicated bus and operates at a first clock frequency, and the second bus operates at a second clock frequency which is lower in speed than the first clock frequency,
said bus-transmission control unit includes a register operating with being triggered by a signal indicating an effectiveness of the second clock frequency.

26. A data processing system having a memory connected to a first bus, comprising:
an external device;
a second bus to connect the data processing system with the external device, the external device granting a priority use of said second bus thereto; and
a first data processing device accessing said memory via said first bus in accordance with granting of the priority use to access said memory made by the external device via said second bus, wherein the memory is an SDRAM, the first bus is an SDRAM dedicated bus and operates at a first clock frequency, and the second bus operates at a second clock frequency which is lower in speed than the first clock frequency, said bus-transmission control unit includes a register operating with being triggered by a signal indicating an effectiveness of the second clock frequency.

* * * * *